United States Patent
Hayashi et al.

(10) Patent No.: US 7,807,733 B2
(45) Date of Patent: Oct. 5, 2010

(54) COLOR AGENT FOR ROAD MARKING MATERIAL AND ROAD MARKING MATERIAL USING THE SAME

(75) Inventors: Kazuyuki Hayashi, Hiroshima-ken (JP); Hiroko Morii, Hiroshima-ken (JP); Yusuke Shimohata, Chiba-ken (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 368 days.

(21) Appl. No.: 11/826,268

(22) Filed: Jul. 13, 2007

(65) Prior Publication Data

US 2007/0251412 A1 Nov. 1, 2007

Related U.S. Application Data

(62) Division of application No. 10/650,036, filed on Aug. 28, 2003, now Pat. No. 7,259,194.

(30) Foreign Application Priority Data

Aug. 30, 2002 (JP) ............................. 2002-253523

(51) Int. Cl.
*F21V 7/22* (2006.01)
(52) U.S. Cl. ...................... 523/172; 523/210; 523/212
(58) Field of Classification Search ................ 523/172, 523/210, 212
See application file for complete search history.

(56) References Cited

U.S. PATENT DOCUMENTS 6,153,670 A 11/2000 Skelhorn

FOREIGN PATENT DOCUMENTS

| EP | 1 106 657 A2 | 6/2001 |
|----|----|----|
| EP | 1 184 426 A2 | 3/2002 |
| EP | 1 262 528 A2 | 12/2002 |
| EP | 1 270 686 A2 | 1/2003 |
| EP | 1 325 944 A2 | 7/2003 |

*Primary Examiner*—Edward J Cain
(74) *Attorney, Agent, or Firm*—Nixon & Vanderhye P.C.

(57) ABSTRACT

A color agent for a road marking material comprising composite particles having an average particle diameter of 0.01 to 10.0 μm, said composite particles comprising: inorganic particles; a gluing agent coating layer formed on surface of said inorganic particle; and an organic pigment coat formed onto said gluing agent coating layer in an amount of from 1 to 500 parts by weight based on 100 parts by weight of said inorganic particles. The color agent for a road marking material, contains no harmful elements and exhibits excellent tinting strength, hiding power, light resistance and heat resistance, and is suppressed in surface activity thereof. The road marking material using the color agent, shows a less change in hue with the passage of time and an excellent retroreflective property.

8 Claims, No Drawings

COLOR AGENT FOR ROAD MARKING MATERIAL AND ROAD MARKING MATERIAL USING THE SAME

This application is a divisional of application Ser. No. 10/650,036 filed Aug. 28, 2003, now U.S. Pat. No. 7,259,194, which in turn claims priority of Japanese application Ser. No. 2002-253523 filed Aug. 30, 2002, the entire content of which is hereby incorporated by reference in this application.

BACKGROUND OF THE INVENTION

The present invention relates to a color agent for a road marking material and a road marking material using the color agent. More particularly, to a color agent for a road marking material, which contains no harmful elements and exhibits excellent tinting strength, hiding power, light resistance and heat resistance, and which is suppressed in surface activity thereof, and a road marking material using the color agent, which shows a less change in hue with the passage of time and an excellent retroreflective property.

Hitherto, white or yellow road marking materials have been used to form zone lines, road signs, etc., for the purpose of obeying traffic laws and regulations and preventing or minimizing traffic accidents.

On the other hand, in recent years, various characters or complicated marks have been frequently used in Japan as road markings. Thus, green- or brick-colored road marking materials have been applied to school zones, bicycle roads, etc. Further, in Japan it has been demanded to use designed color marks in community squares, shopping roads, jogging courses, cycling roads, promenades, parks, etc., in order to expect environmental beautification or PR effects.

The road marking materials are classified into cold-applied paint-types (first class), heat-applied paint-types (second class) and melt types (third class) according to JIS K 5665. Further, corresponding to the above color marks, there are known adhesion-type road marking materials such as heat-adhesion types and cold-adhesion types.

Any of the above road marking materials is used outdoors for a long period of time and, therefore, is required to have a less change in hue with the passage of time after application to roads. It is known that the change in hue of the road marking materials is caused by discoloration of color agents or deterioration of resins due to ultraviolet radiation or acid rain, deterioration of resins due to high surface activity of color agents, or the like. Thus, the color agents used in the road marking materials are required to exhibit a high weather resistance as well as a low surface activity.

Also, among the above-mentioned road marking materials, the melt-type road marking materials (third class) are heated and molten at a temperature as high as about 200° C. For this reason, color agents used in such melt-type road marking materials are required to show a heat resistance capable of preventing discoloration thereof even when heated at such a high temperature.

In addition, in order to shield a road surface made of asphalt or concrete and allow a road surface to show the aimed hue, the color agents used in the above road marking materials are also required to have excellent hiding power and tinting strength.

Among the road marking materials, the yellow road marking materials for traffic signs are especially important to users, since the yellow color is intended to indicate regulations or cautions on traffic. The hue of the yellow color used for these purposes is unified as a common "yellow for traffic signs or markings" by the National Police Agency in Japan.

The yellow road marking materials tend to be deteriorated in reflectivity as compared to white road marking materials. In particular, it is known that when only a small amount of light emitted from headlight or street lamps such as mercury lamp and sodium lamp is present during the night, the visibility of the yellow markings is considerably low as compared to that during the daytime. Therefore, the color agents used in the yellow road marking materials are required to be free from discoloration even when exposed to a long-term outdoor use and when melted under a high temperature condition, to show a hue lying within the common "yellow for traffic signs or markings", and to have an excellent night reflectivity.

At present, lead chromate has been mainly used as pigments for the yellow road marking materials because of not only excellent heat resistance and weather resistance but also clear hue thereof. However, the lead chromate contains heavy metals such as chromium and lead. For this reason, it has been demanded to provide alternate yellow pigments from the standpoints of hygiene, safety and prevention of environmental pollution.

As yellow pigments for road marking materials other than lead chromate, there are known inorganic pigments such as titanium yellow, iron oxide hydroxide and bismuth vanadate; and yellow-based organic pigments such as azo-based, isoindolinone-based and anthraquinone-based pigments.

However, although the above inorganic pigments are excellent in heat resistance and weather resistance, these pigments tend to be deteriorated in tinting strength, thereby failing to show a clear hue. On the other hand, the above organic pigments usually show a clear hue, but tend to be deteriorated in hiding power as well as heat resistance and light resistance. Thus, any of the conventional inorganic and organic pigments fails to satisfy properties required as alternate materials of lead chromate. Further, it is known that road marking materials using such color agents tend to be deteriorated in visibility during the night.

Hitherto, in order to obtain pigments as alternate materials of lead chromate which are free from environmental pollution, and improved in weather resistance and heat resistance as well as visibility during the night, it has been attempted to combine the inorganic pigments with the organic pigments (Japanese Patent Application Laid-Open (KOKAI) Nos. 4-132770(1992), 7-331113(1995), 8-209030(1996), 9-100420(1997) and 2001-220550, etc.).

At present, it has been strongly required to provide a color agent for a road marking material which shows a less change in hue with the passage of time and is capable of producing such a road marking material exhibiting an excellent retroreflective property. However, such color agent has not been obtained until now.

That is, in the methods described in Japanese Patent Application Laid-Open (KOKAI) Nos. 4-132770(1992) and 9-100420(1997), since organic pigments are precipitated in the presence of an inorganic pigment to form a organic pigment layer on the surface of the inorganic pigment, the organic pigments fail to have a sufficient adhesion strength to the inorganic pigments as shown in the below-mentioned Comparative Examples. Further, since the obtained color agent has a high surface activity, the road marking material produced from such a color agent tends to undergo a large change in hue with the passage of time.

Also, in the method described in Japanese Patent Application Laid-Open (KOKAI) No. 7-331113(1995), organic pigments are charged together with inorganic pigments having a refractive index of not less than 2.2 and a coupling agent into a mixer, and stirred and mixed together therein to adhere the organic pigments onto the surface of the inorganic pigments.

However, as shown in the below-mentioned Comparative Examples, the adhesion strength of the organic pigments onto the inorganic pigments tends to become insufficient as compared to the color agent for a road marking material according to the present invention in which organic pigments are adhered onto the surface of inorganic particles through a gluing agent coating layer. Therefore, a road marking material produced from the above conventional color agent may fail to show sufficient alkali resistance, abrasion resistance and aging resistance.

In addition, in Japanese Patent Application Laid-Open (KOKAI) Nos. 8-209030(1996) and 2001-220550, there are described heat-melting type road marking paints comprising caking resin, color agent and filler in which a pigment composition containing organic and inorganic pigments is used as the color agent. However, in these prior publications, the surface activity of the color agent is not taken into consideration. Therefore, it is suggested that the road marking material produced from such a color agent tends to undergo a large change in hue with the passage of time.

Meanwhile, in Japanese Patent Application Laid-Open (KOKAI) No. 2001-262297, there are described composite particles produced by adhering organic pigments onto the surface of white inorganic particles through a gluing agent. However, the object of this KOKAI is to suppress desorption of the organic pigments from the surface of the white inorganic particles, and this KOKAI is silent in the surface activity of the obtained composite particles.

As a result of the present inventors' earnest studies, it has been found that when composite particles having an average particle diameter of 0.01 to 10.0 μm which are produced by adhering 1 to 500 parts by weight of organic pigments onto 100 parts by weight of inorganic particles through a gluing agent and which may be further coated with a fatty acid, a fatty acid metal salt or a coupling agent, are used as a color agent for a road marking material, the obtained road marking material can show a less change in hue with the passage of time and an excellent retroreflective property. The present invention has been attained on the basis of the finding.

SUMMARY OF THE INVENTION

An object of the present invention is to provide a color agent for a road marking material which contains no harmful elements, exhibits excellent tinting strength, hiding power, light resistance and heat resistance, and is suppressed in its surface activity.

Another object of the present invention is to provide a road marking material having a less change in hue with the passage of time and exhibiting an excellent retroreflective property.

To accomplish the aims, in a first aspect of the present invention, there is provided a color agent for a road marking material comprising composite particles having an average particle diameter of 0.01 to 10.0 μm, said composite particles comprising:

inorganic particles;

a gluing agent coating layer formed on surface of said inorganic particle; and an organic pigment coat formed onto said gluing agent coating layer in an amount of from 1 to 500 parts by weight based on 100 parts by weight of said inorganic particles.

In a second aspect of the present invention, there is provided a color agent for a road marking material comprising composite particles having an average particle diameter of 0.01 to 10.0 μm, said composite particles comprising:

inorganic particles;

a gluing agent coating layer formed on surface of said inorganic particle;

an organic pigment coat formed onto said gluing agent coating layer in an amount of from 1 to 500 parts by weight based on 100 parts by weight of said inorganic particles; and a surface coating layer composed of at least one material selected from the group consisting of a fatty acid, a fatty acid metal salt and a coupling agent, which is formed on said organic pigment coat in an amount of 0.1 to 10.0% by weight based on the total weight of the composite particles including the surface coating layer.

In a third aspect of the present invention, there is provided a road marking material comprising a binder resin, the color agent as defined in the first aspect and a filler, said color agent being contained in an amount of 0.1 to 60% by weight based on the weight of the road marking material.

In a fourth aspect of the present invention, there is provided a road marking material comprising a binder resin, the color agent as defined in the second aspect and a filler, said color agent being contained in an amount of 0.1 to 60% by weight based on the weight of the road marking material.

In a fifth aspect of the present invention, there is provided in a method of forming a road marking material comprising a binder resin, a color agent and a filler, the improvement comprising using as said color agent, composite particles having an average particle diameter of 0.01 to 10.0 μm, said composite particles comprising:

inorganic particles;

a gluing agent coating layer formed on surface of said inorganic particle; and an organic pigment coat formed onto said gluing agent coating layer in an amount of from 1 to 500 parts by weight based on 100 parts by weight of said inorganic particles.

In a sixth aspect of the present invention, there is provided in a method of forming a road marking material comprising a binder resin, a color agent and a filler, the improvement comprising using as said color agent, composite particles having an average particle diameter of 0.01 to 10.0 μm, said composite particles comprising:

inorganic particles;

a gluing agent coating layer formed on surface of said inorganic particle;

an organic pigment coat formed onto said gluing agent coating layer in an amount of from 1 to 500 parts by weight based on 100 parts by weight of said inorganic particles; and a surface coating layer composed of at least one material selected from the group consisting of a fatty acid, a fatty acid metal salt and a coupling agent, which is formed on said organic pigment coat in an amount of 0.1 to 10.0% by weight based on the total weight of the composite particles including the surface coating layer.

DETAILED DESCRIPTION OF THE INVENTION

The present invention will now be described in detail below.

First, the color agent for a road marking material according to the present invention is described.

The color agent for a road marking material according to the present invention is composed of composite particles comprising inorganic particles as core particles, a gluing agent coating layer formed on the surface of the inorganic particles, and an organic pigment coat adhered onto the gluing agent coating layer.

Meanwhile, in the color agent for a road marking material according to the present invention, a plurality of coloring adhesion layers composed of the organic pigments as the organic pigment coat may be formed on the surface of the inorganic particle as core particles in order to attain the aimed hue. For example, after forming the gluing agent coating layer on the surface of the inorganic particle, an organic pigment coat (hereinafter referred to merely as "first coloring adhesion layer") is formed by adhering the organic pigments onto the gluing agent coating layer (the inorganic particles on which the first coloring adhesion layer is formed is hereinafter referred to as "intermediate particles"). Then, after further forming a gluing agent coating layer on the first coloring adhesion layer, an organic pigment coat (hereinafter referred to merely "second coloring adhesion layer") is formed by adhering the organic pigments onto the gluing agent coating layer. The same procedure as described above may be repeated to form at least one additional coloring adhesion layer on the surface of the inorganic particles, if required. Hereinafter, the composite particles having two or more coloring adhesion layers are referred to as "composite particles having a plurality of coloring adhesion layers".

As the inorganic particles used in the present invention, there may be exemplified white pigments such as titanium dioxide, zirconium oxide and zinc oxide; extender pigments such as fine silica particles such as silica powder, white carbon, fine silicic acid powder and diatomaceous earth, clay, calcium carbonate, barium sulfate, alumina white, talc and transparent titanium oxide; and inorganic pigments such as titanium yellow, hematite and iron oxide hydroxide. These inorganic particles may be used singly or in the form of a mixture of any two or more thereof. Among these inorganic particles, in the consideration of the contrast ratio and retroreflective property of the obtained road marking material, the preferred inorganic particles are titanium dioxide particles. Also, mixed inorganic particles containing titanium dioxide particles and inorganic particles containing titanium dioxide are preferred.

The inorganic particles may have any suitable shape, and, for example, may be spherical particles, granular particles, polyhedral particles, acicular particles, spindle-shaped particles, rice ball-like particles, flake-shaped particles, scale-like particles or plate-shaped particles.

The average particle diameter of the inorganic particles is usually 0.01 to 10.0 µm, preferably 0.02 to 9.5 µm more preferably 0.03 to 9.0 µm. When the average particle diameter of the inorganic particles is more than 10.0 µm, the obtained color agent for a road marking material becomes coarse particles, resulting in deteriorated tinting strength thereof. When the average particle diameter of the inorganic particles is less than 0.01 µm, the inorganic particles tend to be agglomerated due to such fine particles. As a result, it may become difficult to form a uniform gluing agent coating layer on the surface of the inorganic particles, and uniformly adhere the organic pigments onto the surface of the gluing agent coating layer.

The inorganic particles preferably have a BET specific surface area value of preferably not less than 0.5 $m^2/g$. When the BET specific surface area value is less than 0.5 $m^2/g$, the inorganic particles tend to become coarse particles, or sintering tends to be caused within or between the particles, so that the obtained color agent for a road marking material also tends to become coarse particles and, therefore, be deteriorated in tinting strength. In the consideration of tinting strength of the obtained color agent for a road marking material, the BET specific surface area value of the inorganic particles is more preferably not less than 1.0 $m^2/g$, still more preferably 1.5 $m^2/g$. In the consideration of forming a uniform gluing agent coating layer on the surface of the inorganic particles or uniformly adhering the organic pigments onto the surface of the gluing agent coating layer, the upper limit of the BET specific surface area value of the inorganic particles is preferably 500 $m^2/g$, more preferably 400 $m^2/g$, still more preferably 300 $m^2/g$.

The refractive index of the inorganic particles used in the present invention may be appropriately selected according to aimed applications of the color agent for a road marking material. In the consideration of color-developing property and retroreflective property of the obtained color agent for a road marking material, there may be preferably used mixed inorganic particles produced by mixing white pigments having a refractive index of not less than 2.0 with extender pigments having a refractive index of less than 2.0. In particular, in order to obtain a road marking material requiring a high retroreflective property, it is preferred to use inorganic particles having a higher retroreflective property. In such a case, the refractive index of the inorganic particles is preferably not less than 2.0, more preferably not less than 2.2.

The hue of the inorganic particles used in the present invention may be appropriately selected according to the aimed hue of the color agent for a road marking material. For example, the L* value thereof is preferably not less than 30.0, and the C* value thereof is preferably not more than 70.0. In the consideration of the visibility during the night of the obtained road marking material, the L* value of the inorganic particles is more preferably not less than 50.0, still more preferably not less than 60.0, further still more preferably not less than 70.0. In the consideration of color toning, the C* value of the inorganic particles is more preferably not more than 20.0, still more preferably not more than 15.0, further still more preferably not more than 10.0.

The hiding power of the inorganic particles used in the present invention may be appropriately selected according to the aimed applications of the color agent for a road marking material. For example, in the case where the color agent is used in such applications requiring a delicate hue or a hue much closer to an original color of organic pigments adhered onto the inorganic particles, the hiding power thereof is preferably less than 400 $cm^2/g$, more preferably not more than 300 $cm^2/g$, still more preferably not more than 200 $cm^2/g$. In the case where the color agent is used in such applications requiring a high hiding power, the hiding power of the inorganic particles is preferably not less than 400 $cm^2/g$, more preferably not less than 600 $cm^2/g$, still more preferably not less than 800 $cm^2/g$.

As to the light resistance of the inorganic particles used in the present invention, the lower limit of the ΔE* value thereof is usually more than 5.0, and the upper limit of the ΔE* value is usually 12.0, preferably 11.0, more preferably 10.0 when measured by the below-mentioned evaluation method.

The gluing agent used in the present invention may be of any kind as long as the organic pigment can be adhered onto the surface of the inorganic particles therethrough. Examples of the preferred gluing agents may include organosilicon compounds such as alkoxysilanes, fluoroalkylsilanes and polysiloxanes; various coupling agents such as silane-based coupling agents, titanate-based coupling agents, aluminate-based coupling agents and zirconate-based coupling agents; oligomer compounds; polymer compounds; or the like. These gluing agents may be used singly or in the form of a mixture of any two or more thereof. In the consideration of adhesion strength of the organic pigments onto the surface of the inorganic particle through the gluing agent coating layer, the more preferred gluing agents are the organosilicon compounds such as alkoxysilanes, fluoroalkylsilanes and polysiloxanes, and various coupling agents such as silane-based coupling agents, titanate-based coupling agents, aluminate-based coupling agents and zirconate-based coupling agents, and still more preferred gluing agents are the organosilicon compounds such as alkoxysilanes, fluoroalkylsilanes and polysiloxanes.

As the organosilicon compounds used in the present invention, there may be exemplified organosilane compounds obtained from alkoxysilane compounds represented by the below-mentioned formula (I), polysiloxanes represented by the below-mentioned formula (II), modified polysiloxanes represented by the below-mentioned formula (III), terminal-modified polysiloxanes represented by the below-mentioned formula (IV), fluoroalkylsilanes represented by the below-mentioned formula (V), or mixtures thereof.

$$R^1_a SiX_{4-a} \quad (I)$$

wherein $R^1$: $C_6H_5-$, $(CH_3)_2CHCH_2-$ or n-$C_mH_{2m+1}-$;

X: $CH_3O-$ or $C_2H_5O-$;

m: an integer of 1 to 18; and a: an integer of 0 to 3

Specific examples of the alkoxysilanes may include methyltriethoxysilane, dimethyldiethoxysilane, phenyltriethyoxysilane, diphenyldiethoxysilane, dimethyldimethoxysilane, methyltrimethoxysilane, phenyltrimethoxysilane, diphenyldimethoxysilane, isobutyltrimethoxysilane, decyltrimethoxysilane or the like.

In the consideration of the adhesion strength of the organic pigments onto the surface of the inorganic particles, the organosilane compounds obtainable from methyltriethoxysilane, methyltrimethoxysilane, dimethyldimethoxysilane, isobutyltrimethoxysilane and phenyltriethyoxysilane are more preferred, and the organosilane compounds obtainable from methyltriethoxysilane, methyltrimethoxysilane and phenyltriethyoxysilane are most preferred.

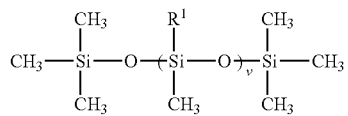

(II)

wherein $R^1$: H, $CH_3$; and v: 15 to 450

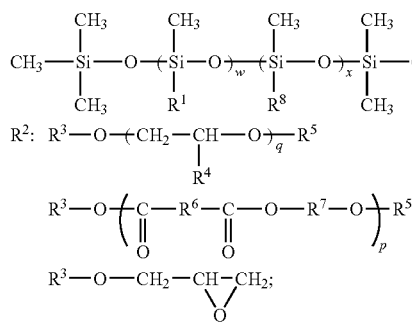

(III)

$R^3$, $R^6$ and $R^7$: $-(-CH_2-)_l-$ and may be the same or different;

$R^4$ and $R^8$: $-(-CH_2-)_m-CH_3$;

$R^5$: $-OH$, $-COOH$, $-CH=CH_2$, $-C\equiv CH_3$ or $-(-CH_2-)_n-CH_3$;

l: 1 to 15;

m, n: 0 to 15;

w: 1 to 50; and x: 1 to 300

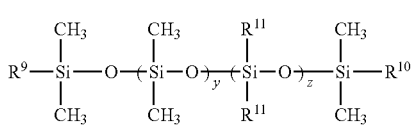

(IV)

wherein $R^9$ and $R^{10}$: $-OH$, $R^{12}OH$ or $R^{13}COOH$ and may be the same or different;

$R^{11}$: $-CH_3$ or $-C_6H_5$;

$R^{12}$ and $R^{13}$: $-(-CH_2-)_p-$;

l: 1 to 15;

y: 1 to 200; and z: 0 to 100

In the consideration of the adhesion strength of the organic pigments onto the surface of the inorganic particles, polysiloxanes having methyl hydrogen siloxane units, polyether-modified polysiloxanes and carboxylic acid-terminal-modified polysiloxanes are preferred.

Specific examples of the fluoroalkylsilanes may include trifluoropropyl trimethoxysilane, tridecafluorooctyl trimethoxysilane, heptadecafluorodecyl trimethoxysilane, heptadecafluorodecylmethyl dimethoxysilane, trifluoropropylethoxysilane, tridecafluorooctyl triethoxysilane, heptadecafluorodecyl triethoxysilane or the like.

In the consideration of the adhesion strength of the organic pigments onto the surface of the inorganic particles, the fluorine-containing organosilane compounds obtainable from trifluoropropyl trimethoxysilane, tridecafluorooctyl trimethoxysilane and heptadecafluorodecyl trimethoxysilane are more preferred, and the fluorine-containing organosilane compounds obtainable from trifluoropropyl trimethoxysilane and tridecafluorooctyl trimethoxysilane are most preferred.

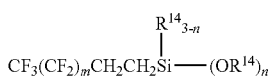

(V)

wherein $R^{14}$: $-CH_3$, $-C_2H_5$;

m: 0 to 15; and n: 1 to 3

Among the coupling agents, as the silane-based coupling agents, there may be exemplified vinyltrimethoxysilane, vinyltriethoxysilane, γ-aminopropyltriethoxysilane, γ-glycidoxypropyltrimethoxysilane, γ-mercaptopropyltrimethoxysilane, γ-methacryloxypropyltrimethoxysilane, N-β(aminoethyl)-γ-aminopropyltrimethoxysilane, γ-glycidoxypropylmethyldimethoxysilane, γ-chloropropyltrimethoxysilane, or the like.

As the titanate-based coupling agents, there may be exemplified isopropyltristearoyl titanate, isopropyltris(dioctylpyrophosphate)titanate, isopropyltri(N-aminoethyl-aminoethyl) titanate, tetraoctylbis(ditridecylphosphate)titanate, tetra(2,2-diaryloxymethyl-1-butyl)bis(ditridecyl)phosphate titanate, bis(dioctylpyrophosphate)oxyacetate titanate, bis(dioctylpyrophosphate)ethylene titanate, or the like.

As the aluminate-based coupling agents, there may be exemplified acetoalkoxyaluminum diisopropylate, aluminumdiisopropoxymonoethylacetoacetate, aluminumtrisethylacetoacetate, aluminumtrisacetylacetonate, or the like.

As the zirconate-based coupling agents, there may be exemplified zirconiumtetrakisacetylacetonate, zirconiumdibutoxybisacetylacetonate, zirconiumtetrakisethylacetoacetate, zirconiumtributoxymonoethylacetoacetate, zirconiumtributoxyacetylacetonate, or the like.

It is preferred to use oligomer compounds having a molecular weight of from 300 to less than 10,000. It is preferred to use polymer compounds having a molecular weight of about 10,000 to about 100,000. In the consideration of forming a uniform coating layer on the inorganic particles, the oligomer compounds or polymer compounds are preferably in a liquid state, or soluble in water or various solvents.

The amount of the gluing agent coating layer is preferably 0.01 to 15.0% by weight, more preferably 0.02 to 12.5% by weight, still more preferably 0.03 to 10.0% by weight (calculated as C) based on the weight of the gluing agent-coated inorganic particles. When the amount of the gluing agent coating layer is less than 0.01% by weight, it may be difficult not only to adhere not less than one part by weight of the organic pigments onto 100 parts by weight of the inorganic particles, but also to reduce the surface activity to the desired value. Since the gluing agent coating layer coated on the inorganic particles in an amount up to 15% by weight enables 1 to 500 parts by weight of the organic pigments to adhere onto 100 parts by weight of the inorganic particles therethrough, it is not necessary to form the gluing agent coating layer in an amount of more than 15.0% by weight.

As the organic pigments used in the present invention, there may be exemplified various organic pigments ordinarily used as color agents of paints and resin compositions, such as organic red-based pigments, organic blue-based pigments, organic yellow-based pigments, organic green-based pigments, organic orange-based pigments, organic brown-based pigments and organic violet-based pigments.

In particular, in the case of the color agent for yellow-based road marking material which is used as an alternate material of lead chromate, in order to adjust the hue thereof to the common "yellow for traffic signs or markings", there may be used at least one kind of organic pigments selected from the group consisting of organic yellow-based pigments, organic orange-based pigments and organic red-based pigments.

Among various organic pigments mentioned above, examples of the organic red-based pigments may include azo-based pigments such as permanent carmine and permanent red, condensed azo pigments such as condensed azo red, condensed polycyclic pigments such as quinacridon-based pigments, perylene-based pigments, perinone-based pigments, anthraquinone-based pigments, isoindolinone-based pigments, diketo-pyrrolo-pyrrole-based pigments, or the like.

Examples of the organic blue-based pigments may include phthalocyanine-based pigments such as metal-free phthalocyanine blue, phthalocyanine blue and fast sky blue, alkali blue or the like.

Examples of the organic yellow-based pigments may include monoazo-based pigments such as Hanza yellow, disazo-based pigments such as benzidine yellow and permanent yellow, condensed azo pigments such as condensed azo yellow, condensed polyciclyic-based pigments such as isoindolinone-based pigments, isoindoline-based pigments, quinophthalone-based pigments, anthraquinone-based pigments, or the like.

Examples of the organic green-based pigments may include phthalocyanine-based pigments such as phthalocyanine green, or the like.

Examples of the organic orange-based pigments may include azo-based pigments such as permanent orange, lithol fast orange and vulcan fast orange, or the like.

Examples of the organic brown-based pigments may include azo-based pigments such as permanent brown and para-brown, or the like.

Examples of the organic violet-based pigments may include azo-based pigments such as fast violet, or the like.

Meanwhile, these organic pigments may be used in the form of a mixture of any two or more thereof depending upon the hue required. Also, a mixture composed of two or more organic pigments showing the similar kind of color may be used depending upon the hue and properties required.

Meanwhile, in the color agent for a road marking material which has a plurality of coloring adhesion layers, the organic pigments used in the first coloring adhesion layer may be the same as those used in the second or subsequent coloring adhesion layer, may be identical in color but different in kind from those used in the second or subsequent coloring adhesion layer, or different in color from those used in the second or subsequent coloring adhesion layer.

The total amount of the organic pigments adhered is usually 1 to 500 parts by weight, preferably 5 to 400 parts by weight, more preferably 10 to 300 parts by weight based on 100 parts by weight of the inorganic particles. When the total amount of the organic pigments adhered is less than one part by weight, the amount of the organic pigments adhered onto the surface of the inorganic particles is too small, so that it may become difficult to obtain the aimed color agent for a road marking material of the present invention which has a high tinting strength. When the total amount of the organic pigments adhered is more than 500 parts by weight, the organic pigments adhered tend to be desorbed from the inorganic particles because of too large amount of the organic pigments adhered. As a result, the obtained color agent for a road marking material may be deteriorated in dispersibility in the road marking material, so that it may be difficult to obtain a road marking material having a uniform hue.

In the case of the color agent for a road marking material having a plurality of coloring adhesion layer, the amount of the organic pigments adhered in each coloring adhesion layer may be appropriately selected depending upon the hue and properties required, and within such a range that the total amount of the organic pigments adhered falls in the above-specified range.

The shape and size of the color agent for a road marking material according to the present invention may vary depending upon those of the inorganic particles as core particles. The color agent for a road marking material usually have a configuration or shape similar to that of the core particles.

Specifically, the average particle diameter of the color agent for a road marking material according to the present invention is usually 0.01 to 10.0 µm, preferably 0.02 to 9.5 µm, more preferably 0.03 to 9.0 µm. When the average particle diameter of the color agent for a road marking material is more than 10.0 µm the color agent for a road marking material tends to be deteriorated in tinting strength because of too large particle size thereof. When the average particle diameter of the color agent for a road marking material is less than 0.01 µm, the color agent for a road marking material tends to be agglomerated together due to such fine particles, so that it may become difficult to well disperse the color agent in the road marking material.

The BET specific surface area value of the color agent for a road marking material according to the present invention is preferably 0.5 to 500 m²/g, more preferably 1.0 to 400 m²/g, still more preferably 1.5 to 300 m²/g. When the BET specific surface area value of the color agent for a road marking material is less than 0.5 m²/g, the color agent tends to become coarse particles, or sintering tends to be caused within or between the particles, so that the obtained color agent tends to be deteriorated in tinting strength.

The lightness of the color agent for a road marking material according to the present invention considerably varies depending upon the aimed hue of the color agent for a road marking material and, therefore, is not exactly determined. Nevertheless, the higher lightness of the color agent can lead to a more excellent visibility during the night. In particular, in the case of the yellow-based road marking material, the L* value thereof is preferably not less than 40.0, more preferably not less than 50.0, still more preferably not less than 60.0.

The tinting strength of the color agent for a road marking material according to the present invention is preferably not less than 110%, more preferably not less than 115%, still more preferably not less than 120% when measured by the below-mentioned evaluation method.

The hiding power of the color agent for a road marking material according to the present invention is preferably not less than 200 cm²/g. In the consideration of a good contrast ratio of the obtained road marking material, the hiding power of the color agent is more preferably not less than 400 cm²/g, still more preferably not less than 600 cm²/g, most preferably not less than 800 cm²/g.

The surface activity of the color agent for a road marking material according to the present invention is preferably not more than 2%, more preferably not more than 1.5% when measured by the below-mentioned evaluation method. When the surface activity of the color agent is more than 2%, the resins contained in the obtained road marking material tend to be deteriorated because of a too high surface activity of the color agent, resulting in undesirable change in hue of the road marking material as well as poor strength thereof.

The heat resistance of the color agent for a road marking material according to the present invention is preferably not less than 180° C. when measured by the below-mentioned evaluation method. In particular, when the color agent is applied to a melt-type road marking paint defined in JIS K 5665 (third class), the heat resistance of the color agent for a road marking material is preferably not less than 190° C., more preferably not less than 200° C., still more preferably 210° C. In this case, when the heat-resisting temperature is less than 190° C., the paint tends to be sometimes deteriorated during heat-melting thereof.

As to the light resistance of the color agent for a road marking material according to the present invention, the $\Delta E^*$ value thereof is usually not more than 5.0, preferably not more than 4.0 when measured by the below-mentioned evaluation method. In particular, when the light resistance ($\Delta E^*$ value) of the color agent is more than 5.0, the color agent tends to undergo discoloration upon exposure to ultraviolet light, etc. As a result, the road marking material obtained from such a color agent tends to suffer from a large change in hue with the passage of time after application to the road.

The desorption percentage of the organic pigments from the color agent for a road marking material according to the present invention is preferably not more than 20%, more preferably not more than 15%. When the desorption percentage of the organic pigments from the color agent is more than 20%, the color agent tends to be prevented from being uniformly dispersed in the paint by the desorbed organic pigments, and further since the hue of the inorganic particles is exposed to the outer surface of the color agent particles at portions from which the organic pigments are desorbed, it may be difficult to attain a uniform and desirable hue thereof.

In the color agent for a road marking material according to the present invention, if required, the surface of the inorganic particle may be previously coated with at least one intermediate coating material selected from the group consisting of hydroxides of aluminum, oxides of aluminum, hydroxides of silicon and oxides of silicon. The color agent produced using the inorganic particles coated with the intermediate coating material, can be more effectively prevented from undergoing desorption of the organic pigments from the surface of the inorganic particle, and can be improved in heat resistance and light resistance, as compared to the color agent produced using the inorganic particles uncoated with the intermediate coating material. Further, the road marking material obtained from such a color agent using the inorganic particles coated with the intermediate coating material, can exhibit a more excellent abrasion resistance.

The amount of the intermediate coating material coated on the surface of the inorganic particles is preferably 0.01 to 20.0% by weight (calculated as Al, $SiO_2$ or a sum of Al and $SiO_2$) based on the weight of the inorganic particles coated with the intermediate coating material. When the amount of the intermediate coating material coated is less than 0.01% by weight, it may be difficult to attain the aimed effects of reducing the desorption percentage of organic pigments and improving the light resistance. When the intermediate coating material is coated in an amount of 0.01 to 20% by weight, the effects of reducing the desorption percentage of organic pigments and improving the heat resistance and light resistance can be sufficiently attained. Therefore, it is not necessary to coat the intermediate coating material in an amount of more than 20% by weight.

The color agent for a road marking material produced using the inorganic particles coated with the intermediate coating material according to the present invention, is substantially the same in particle size, BET specific surface area value, lightness, tinting strength, hiding power and surface activity as those of the color agent for a road marking material produced using the inorganic particles uncoated with the intermediate coating material according to the present invention. The desorption percentage of the organic pigments from the color agent for a road marking material using the inorganic particles coated with the intermediate coating material, is preferably not more than 15%, more preferably not more than 10%. As to the light resistance of the color agent, the $\Delta E^*$ value thereof is preferably not more than 4.0, more preferably 3.0. Also, by coating such the intermediate coating material on the surface of the inorganic particles, the heat resistance of the obtained color agent for a road marking material can be increased by about 5 to 10° C. than that of the color agent for a road marking material using the inorganic particles uncoated with the intermediate coating material according to the present invention.

If required, the surface of the color agent for a road marking material according to the present invention may be further coated with a fatty acid, a fatty acid metal salt or a silane-based coupling agent. The road marking material using the color agent coated with a fatty acid, a fatty acid metal salt or a silane-based coupling agent can be reduced in surface activity and can be improved in abrasion resistance as compared with the road marking material using the color agent uncoated therewith.

As the fatty acid used in the present invention, there may be exemplified saturated or unsaturated fatty acids, preferably saturated or unsaturated fatty acids having 12 to 22 carbon atoms.

As the fatty acid metal salt used in the present invention, there may be exemplified salts of saturated or unsaturated fatty acids and metals. Specific examples of the fatty acid metal salt may include salts of saturated or unsaturated fatty acids having 12 to 22 carbon atoms with alkali earth metals such as magnesium, calcium, strontium and barium, alkali metals such as lithium, sodium and potassium, or metals such as aluminum, copper, iron, lead and tin. In the consideration of good abrasion resistance of the obtained road marking material, the preferred fatty acid metal salts are salts of stearic acid with alkali earth metals, or zinc stearate.

As the silane-based coupling agent used in the present invention, there may be exemplified those compounds ordinarily blended in resin compositions. Examples of the silane-based coupling agent may include γ-aminopropyltriethoxysilane, γ-aminopropyltrimethoxysilane, vinyltrimethoxysilane, vinyltriethoxysilane, vinyltrichlorosilane, γ-chloropropyltrimethoxysilane, γ-chloropropylmethyldichlorosilane, γ-chloropropylmethyldimethoxysilane, γ-mercaptopropyltrimethoxysilane, γ-glycidoxypropyltrimethoxysilane, γ-glycidoxypropylmethyldiethoxysilane, γ-methacryloxypropyltrimethoxysilane, γ-methacryloxypropylmethyldimethoxysilane, N-β(aminoethyl)-γ-aminopropyltrimethoxysilane, N-β(aminoethyl)-γ-aminopropylmethyldimethoxysilane, vinyltris(β-methoxyethoxy)silane, β-(3,4-epoxycyclohexyl)ethyltrimethoxysilane, N-phenyl-γ-aminopropyltrimethoxysilane or the like.

The amount of the fatty acid, fatty acid metal salt or silane-based coupling agent coated on the color agent is preferably 0.1 to 10.0% by weight, more preferably 0.2 to 7.5% by weight, still more preferably 0.3 to 5.0% by weight (calculated as C) based on the weight of the color agent coated with the fatty acid, fatty acid metal salt or silane-based coupling agent. When the amount of the fatty acid, fatty acid metal salt or silane-based coupling agent coated on the color agent is less than 0.1% by weight, it may be difficult to further reduce the surface activity thereof, and attain the effect of improving an abrasion resistance of the obtained road marking material. Even though the fatty acid, fatty acid metal salt or silane-based coupling agent is coated on the color agent in an amount of more than 10.0% by weight, since the effects of reducing the surface activity and improving the abrasion resistance of the road marking material is already saturated, it is not necessary to coat such a large amount of the fatty acid, fatty acid metal salt or silane-based coupling agent on the color agent.

The color agent for a road marking material whose surface is further coated with the fatty acid, fatty acid metal salt or silane-based coupling agent according to the present invention, is substantially the same in particle size, BET specific surface area value, lightness, tinting strength, hiding power, heat resistance, light resistance and desorption percentage of organic pigments as those of the color agent for a road marking material according to the first aspect of the present invention whose surface is not coated therewith. For example, the color agent for a road marking material whose surface is further coated with the fatty acid, fatty acid metal salt or silane-based coupling agent, has an average particle diameter of usually 0.01 to 10.0 μm, preferably 0.02 to 9.5 μm and a BET specific surface area value of preferably 0.5 to 500 m$^2$/g, preferably 1.0 to 400 m$^2$/g. In particular, in the case of the color agent for yellow-based road marking material, the L* value thereof is preferably not less than 40.0, more preferably not less than 50.0; the tinting strength thereof is preferably not less than 110%, more preferably not less than 115%; the hiding power thereof is preferably not less than 200 cm$^2$/g, more preferably not less than 400 cm$^2$/g; the heat resistance thereof is preferably not less than 180° C., more preferably not less than 190° C.; the light resistance (ΔE* value) thereof is preferably not more than 5.0, more preferably not more than 4.0; the desorption percentage of organic pigments thereof is preferably not more than 20%, more preferably not more than 15%; and the surface activity thereof is preferably not more than 1.5%, more preferably not more than 1.0%.

Next, the road marking material containing the color agent for a road marking material according to the present invention, is described. The road marking material according to the present invention preferably has an abrasion resistance of not more than 400 mg, a light resistance (ΔE* value) of not more than 5.0, and an aging resistance (ΔE* value) of not more than 2.5.

Among the road marking materials containing the color agent for a road marking material according to the present invention, the cold-applied paint-type road marking material defined in JIS K 5665 (first class) has a contrast ratio of preferably not less than 0.80, more preferably not less than 0.85; an alkali resistance of preferably the rank 4 or 5, more preferably the rank 5; an abrasion resistance of preferably not more than 400 mg, more preferably not more than 350 mg; a light resistance (ΔE* value) of preferably not more than 5.0, more preferably not more than 4.0; and an aging resistance (ΔE* value) of preferably not more than 2.5, more preferably not more than 2.0. In addition, in the case of the yellow-based road marking material, the retroreflective property thereof is preferably the rank 3 or 4, more preferably the rank 4 when measured by the below-mentioned evaluation method.

Also, among the cold-applied paint-type road marking materials defined in JIS K 5665 (first class), the road marking material containing the color agent for a road marking material using inorganic particles coated with the intermediate coating material according to the present invention can be remarkably improved in light resistance and abrasion resistance to such an extent that the light resistance (ΔE* value) thereof is preferably not more than 4.0, more preferably not more than 3.0, and the abrasion resistance thereof is preferably not more than 350 mg, more preferably not more than 300 mg.

Further, among the cold-applied paint-type road marking materials defined in JIS K 5665 (first class), the road marking material containing the color agent for a road marking material whose surface is further coated with the fatty acid, fatty acid metal salt or silane-based coupling agent, has a contrast ratio of preferably not less than 0.80, more preferably not less than 0.85; an alkali resistance of preferably the rank 4 or 5, more preferably the rank; a light resistance (ΔE* value) of preferably not more than 5.0, more preferably not more than 4.0; an aging resistance (ΔE* value) of preferably not more than 2.5, more preferably not more than 2.0; and an improved abrasion resistance of preferably not more than 300 mg, more preferably not more than 250 mg. In addition, in the case of the yellow-based road marking material, the retroreflective property thereof is preferably the rank 3 or 4, more preferably the rank 4 when measured by the below-mentioned evaluation method.

Among the road marking materials containing the color agent for a road marking material according to the present invention, the heat-applied paint-type road marking material defined in JIS K 5665 (second class) has a contrast ratio of preferably not less than 0.80, more preferably not less than 0.85; an alkali resistance of preferably the rank 4 or 5, more preferably the rank 5; an abrasion resistance of preferably not more than 350 mg, more preferably not more than 300 mg; a light resistance ($\Delta E^*$ value) of preferably not more than 5.0, more preferably not more than 4.0; and an aging resistance ($\Delta E^*$ value) of preferably not more than 2.5, more preferably not more than 2.0. In addition, in the case of the yellow-based road marking material, the retroreflective property thereof is preferably the rank 3 or 4, more preferably the rank 4 when measured by the below-mentioned evaluation method.

Also, among the heat-applied paint-type road marking materials defined in JIS K 5665 (second class), the road marking material containing the color agent for a road marking material using inorganic particles coated with the intermediate coating material according to the present invention can be improved in light resistance and abrasion resistance such that the light resistance ($\Delta E^*$ value) thereof is preferably not more than 4.0, more preferably not more than 3.0, and the abrasion resistance thereof is preferably not more than 300 mg, more preferably not more than 250 mg.

Further, among the heat-applied paint-type road marking materials defined in JIS K 5665 (second class), the road marking material containing the color agent for a road marking material whose surface is further coated with the fatty acid, fatty acid metal salt or silane-based coupling agent, has a contrast ratio of preferably not less than 0.80, more preferably not less than 0.85; an alkali resistance of preferably the rank 4 or 5, more preferably the rank; a light resistance ($\Delta E^*$ value) of preferably not more than 5.0, more preferably not more than 4.0; an aging resistance ($\Delta E^*$ value) of preferably not more than 2.5, more preferably not more than 2.0; and an improved abrasion resistance of preferably not more than 250 mg, more preferably not more than 200 mg. In addition, in the case of the yellow-based road marking material, the retroreflective property thereof is preferably the rank 3 or 4, more preferably the rank 4 when measured by the below-mentioned evaluation method.

Among the road marking materials containing the color agent for a road marking material according to the present invention, the melt-type road marking material defined in JIS K 5665 (third class) has an alkali resistance of preferably the rank 4 or 5, more preferably the rank 5; an abrasion resistance of preferably not more than 200 mg, more preferably not more than 180 mg; a light resistance ($\Delta E^*$ value) of preferably not more than 5.0, more preferably not more than 4.0; and an aging resistance ($\Delta E^*$ value) of preferably not more than 2.5, more preferably not more than 2.0. In addition, in the case of the yellow-based road marking material, the retroreflective property thereof is preferably the rank 3 or 4, more preferably the rank 4 when measured by the below-mentioned evaluation method.

Also, among the melt-type road marking materials defined in JIS K 5665 (third class), the road marking material containing the color agent for a road marking material using inorganic particles coated with the intermediate coating material according to the present invention can be improved in light resistance and abrasion resistance such that the light resistance ($\Delta E^*$ value) thereof is preferably not more than 4.0, more preferably not more than 3.0, and the abrasion resistance thereof is preferably not more than 180 mg, more preferably not more than 160 mg.

Further, among the melt-type road marking materials defined in JIS K 5665 (third class), the road marking material containing the color agent for a road marking material whose surface is further coated with the fatty acid, fatty acid metal salt or silane-based coupling agent, has an alkali resistance of preferably the rank 4 or 5, more preferably the rank 5; a light resistance ($\Delta E^*$ value) of preferably not more than 5.0, more preferably not more than 4.0; an aging resistance ($\Delta E^*$ value) of preferably not more than 2.5, more preferably not more than 2.0; and an improved abrasion resistance of preferably not more than 160 mg, more preferably not more than 140 mg. In addition, in the case of the yellow-based road marking material, the retroreflective property thereof is preferably the rank 3 or 4, more preferably the rank 4 when measured by the below-mentioned evaluation method.

In the road marking material of the present invention, the color agent for a road marking material may be blended in an amount of 0.1 to 60% by weight based on the weight of base materials of the road marking material depending upon the aimed hue of the road marking material. In particular, in the case of the paint-type road marking materials defined in JIS K 5665 (first class) and JIS K 5665 (second class), the color agent for a road marking material may be blended in an amount of preferably 5 to 60% by weight based on the total weight of base materials of the road marking material, and in the case of the melt-type road marking material defined in JIS K 5665 (third class), the color agent for a road marking material may be blended in an amount of preferably 0.5 to 30% by weight based on the total weight of base materials of the road marking material.

The base materials of the road marking material may contain, in addition to the color agent for a road marking material, resins, fillers and various additives such as solvents, glass beads (reflecting material) and/or plasticizers, solvents, defoamers, surfactants, assistants or the like, which may be optionally blended according to types of road marking materials, if required. The additives may be blended in an amount of usually 1 to 10% by weight based on the total weight of the base materials of the road marking material.

As the resins, there may be used those resins that are generally used in road marking paints. Examples of the resins may include vegetable oil-modified alkyd resins, urethanated alkyd resins, vinylated alkyd resins, vinyl resins, acrylic resins, petroleum resins, rosins and derivatives thereof, terpene resins, polyamide resins, polyester resins, xylene resins, melamine resins, phthalic resins, phenol resins, natural rubbers, synthetic rubbers, styrene-butadiene copolymer resins, water-soluble acrylic resins, water-soluble maleic resins, water-soluble alkyd resins, water-soluble melamine resins, water-soluble urethane emulsion resins, water-soluble epoxy resins, water-soluble polyester resins or the like. These resins may be used singly or in the form of a mixture of any two or more thereof. The resins may be used in an amount of usually 10 to 30% by weight based on the total weight of the base materials of the road marking material.

As the fillers, there may be used those fillers that are generally used in road marking paints. Examples of the fillers may include calcium carbonate, talc, silica powder, glass beads or the like. The fillers may be used in an amount of usually 15 to 85% by weight based on the total weight of the base materials of the road marking material.

As the solvents, there may be used those solvents that are generally used in road marking paints. Examples of the solvents may include aromatic solvents such as toluene, xylene and thinner; ketone-based solvents such as methyl isobutyl ketone, acetone and methyl ethyl ketone; ester-based solvents such as ethyl acetate, butyl acetate and amyl acetate; alcohol-based solvents such as methyl alcohol, ethyl alcohol, propyl alcohol and butyl alcohol; glycol ether-based solvents such as methyl cellosolve, ethyl cellosolve, propyl cellosolve, butyl cellosolve and propylene glycol monomethyl ether; or the like. These solvents may be used singly or in the form of a mixture of any two or more thereof. The solvents may be used in an amount of usually 10 to 50% by weight based on the total weight of the base materials of the road marking material.

Next, the process for producing the color agent for a road marking material according to the present invention is described.

The color agent for a road marking material according to the present invention can be produced by first mixing the inorganic particles with the gluing agent to form a gluing agent coating layer on the surface of the inorganic particles, and then mixing the gluing agent-coated inorganic particles with the organic pigments to form an organic pigment coat on the gluing agent coating layer. By uniformly coating the surface of the inorganic particles with the gluing agent, the surface activity of the particles can be effectively reduced. Further, in the subsequent organic pigment-adhering step, the organic pigments can be uniformly and firmly adhered onto the gluing agent coating layer formed on the surface of the inorganic particles.

The formation of the gluing agent coating layer on the surface of the inorganic particle may be conducted by mechanically mixing and stirring the inorganic particles with the gluing agent or a solution containing the gluing agent, or by mechanically mixing and stirring the inorganic particles while spraying the gluing agent or a solution containing the gluing agent thereonto, whereby a substantially whole amount of the gluing agent added is adhered on the surface of the inorganic particles.

Meanwhile, in the case where alkoxysilanes or fluoroalkylsilanes are used as the gluing agent, a part of the alkoxysilanes or fluoroalkylsilanes may be coated in the form of organosilane compounds obtainable from the alkoxysilanes or fluorine-containing organosilane compounds obtainable from fluoroalkylsilanes through the coating step. Even in such a case, subsequent adhesion of the organic pigments on the gluing agent-coating layer is not adversely affected.

In order to uniformly coat the gluing agent onto the surface of the inorganic particles, it is preferred that the agglomerated inorganic particles are previously deaggregated using a crusher.

The mixing and stirring of the inorganic particles with the gluing agent, and the mixing and stirring of the organic pigments with the gluing agent-coated inorganic particles, are preferably carried out using an apparatus capable of applying a shear force to the powder mixture, especially such an apparatus capable of simultaneously effecting shear action, spatula stroking and compression. Examples of the apparatus may include wheel-type kneaders, ball-type kneaders, blade-type kneaders, roll-type kneaders or the like. Among these apparatuses, the wheel-type kneaders are preferred to effectively practice the present invention.

Specific examples of the wheel-type kneaders may include edge runners (similar in meaning to mix muller, Simpson mill and sand mill), multimill, Stotz mill, wet pan mill, corner mill, ring muller or the like. Among these wheel-type kneaders, the preferred kneaders are edge runners, multimill, Stotz mill, wet pan mill and ring muller, and the more preferred kneaders are edge runners. Specific examples of the ball-type kneaders may include vibration mill or the like. Specific examples of the blade-type kneaders may include Henschel mixer, planetary mixer, Nauter mixer or the like. Specific examples of the roll-type kneaders may include extruders or the like.

The conditions of the mixing and stirring treatment of the inorganic particles with the gluing agent may be selected so as to uniformly coat the surface of the inorganic particles with the gluing agent. Specifically, the mixing and stirring conditions may be appropriately controlled such that the linear load is usually 19.6 to 1,960 N/cm (2 to 200 kg/cm), preferably 98 to 1,470 N/cm (10 to 150 kg/cm), more preferably 147 to 980 N/cm (15 to 100 kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the gluing agent added is preferably 0.15 to 45 parts by weight based on 100 parts by weight of the inorganic particles. By adding the gluing agent in an amount of 0.15 to 45 parts by weight, it is possible to adhere 1 to 500 parts by weight of the organic pigments onto 100 parts by weight of the inorganic particles through the gluing agent coating layer.

After the surface of the inorganic particles is coated with the gluing agent, the organic pigments are added, and then mixed and stirred with the gluing agent-coated inorganic particles to adhere the organic pigments onto the gluing agent coating layer. The obtained particles may be further subjected to drying or heating treatments, if required.

The organic pigments may be added slowly and little by little, especially for a period of 5 minutes to 24 hours, preferably 5 minutes to 20 hours. Alternatively, 5 to 25 parts by weight of the organic pigments may be intermittently added to 100 parts by weight of the inorganic particles until the amount of the organic pigments added reaches the desired value.

Also, when a plurality of organic pigments are used for adjusting the hue, it is preferred that each kind of organic pigments used may be separately added and adhered onto the surface of the inorganic particles. If the plurality of organic pigments are added at the same time, there may be caused undesired adhesion of the particles to an inside of the mixing apparatus, so that it may be difficult to industrially produce treated particles having a uniform hue.

The mixing and stirring conditions of the gluing agent coated inorganic particles with organic pigments may be appropriately selected so as to form a uniform organic pigment coat on the gluing agent coating layer, and may be controlled such that the linear load is usually 19.6 to 1,960 N/cm (2 to 200 kg/cm), preferably 98 to 1,470 N/cm (10 to 150 kg/cm), more preferably 147 to 980 N/cm (15 to 100 kg/cm); the treating time is usually 5 minutes to 24 hours, preferably 10 minutes to 20 hours; and the stirring speed is usually 2 to 2,000 rpm, preferably 5 to 1,000 rpm, more preferably 10 to 800 rpm.

The amount of the organic pigments added is usually 1 to 500 parts by weight, preferably 5 to 400 parts by weight, more preferably 10 to 300 parts by weight based on 100 parts by weight of the inorganic particles.

In the color agent for a road marking material according to the present invention, the organic pigments added are finely divided in the above treating steps to form a uniform and dense adhesion layer composed of the organic pigments on the surface of the inorganic particles through the gluing agent coating layer.

The heating temperature used in the drying and heating treatments is preferably 40 to 150° C., more preferably 60 to 120° C., and the heating time is preferably 10 minutes to 12 hours, more preferably 30 minutes to 3 hours.

Meanwhile, in the case where alkoxysilanes or fluoroalkylsilanes are used as the gluing agent, the alkoxysilanes or fluoroalkylsilanes are finally coated in the form of organosilane compounds obtainable from the alkoxysilanes or fluorine-containing organosilane compounds obtainable from the fluoroalkylsilanes through these steps.

The color agent for a road marking material which has a plurality of coloring adhesion layers, may be produced by mixing the inorganic particles with the gluing agent to form a gluing agent coating layer on the surface of the inorganic particles; mixing the organic pigments with the gluing agent-coated inorganic particles to adhere the organic pigments onto the gluing agent coating layer, thereby forming a first coloring adhesion layer (to obtain intermediate particles); then mixing the thus obtained intermediate particles having the first coloring adhesion layer with the gluing agent; and then further mixing the obtained gluing agent-coated intermediate particles with the organic pigments to form a second coloring adhesion layer onto the second gluing agent coating layer formed on the intermediate particles. The mixing treatment with the gluing agent and the mixing treatment with the organic pigments in each of the above steps may be conducted by the same method as described previously. Meanwhile, by repeating the coating with the gluing agent and the adhesion of the organic pigments according to requirements, it is possible to obtain such a color agent for a road marking material having three or more coloring adhesion layers thereon.

The inorganic particles may be coated, if required, with at least one intermediate coating material selected from the group consisting of hydroxides of aluminum, oxides of aluminum, hydroxides of silicon, and oxides of silicon prior to mixing and stirring step with the gluing agent.

The coating with the intermediate coating material is conducted as follows. That is, an aluminum compound, a silicon compound or both the aluminum and silicon compounds are added to a water suspension prepared by dispersing the inorganic particles in water. The resultant dispersion is mixed and stirred together and then, if required, the pH value thereof is adjusted adequately, thereby coating at least one intermediate coating material selected from the group consisting of hydroxides of aluminum, oxides of aluminum, hydroxides of silicon, and oxides of silicon, on the surface of the inorganic particles. Thereafter, the thus-obtained inorganic particles coated with the intermediate coating material are filtered out, washed with water, dried and then pulverized, and may be further subjected to subsequent treatments such as deaeration and compaction, if required.

Examples of the aluminum compound may include aluminum salts such as aluminum acetate, aluminum sulfate, aluminum chloride and aluminum nitrate, alkali aluminates such as sodium aluminate, or the like.

Examples of the silicon compound may include water glass #3, sodium orthosilicate, sodium metasilicate or the like.

The color agent for a road marking material according to the present invention may also be produced by coating the above-obtained color agent to be coated with a fatty acid, a fatty acid metal salt or a silane-based coupling agent.

The coating of the color agent to be coated with the fatty acid, fatty acid metal salt or silane-based coupling agent may be conducted by mechanically mixing and stirring the color agent to be coated with the fatty acid, fatty acid metal salt or silane-based coupling agent while heating.

The amount of the fatty acid, fatty acid metal salt or silane-based coupling agent coated is preferably 0.13 to 67 parts by weight based on 100 parts by weight of the color agent to be coated therewith. When the fatty acid, fatty acid metal salt or silane-based coupling agent is coated in an amount of 0.13 to 67 parts by weight, it is possible to reduce the surface activity of the obtained color agent for a road marking material and enhance the abrasion resistance of the road marking material obtained using such a color agent.

The heating temperature used in the above step of coating the color agent to be coated with the fatty acid, fatty acid metal salt or silane-based coupling agent, is preferably not less than 40° C., more preferably not less than 50° C., most preferably not less than 60° C., and the upper limit of the heating temperature is 150° C. or a melting or boiling point of the fatty acid, fatty acid metal salt or silane-based coupling agent.

The point of the present invention is that the road marking material containing the color agent which comprises the inorganic particles, the gluing agent coating layer formed on the surface of the inorganic particles and the organic pigment coat formed on the gluing agent coating layer, are substantially free from the change in hue with the passage of time, and can exhibit an excellent retroreflective property.

The reason why the color agent for a road marking material according to the present invention can be inhibited from undergoing the change in hue with the passage of time, is considered by the present inventors as follows.

That is, it is considered that the change in hue of the road marking material is caused by discoloration of color pigments and deterioration of resins due to ultraviolet radiation, acid rain, etc., as well as deterioration of resins due to the high surface activity of the color pigments. On the contrary, in the color agent for a road marking material according to the present invention, by coating the surface of the inorganic particles having a higher light resistance than that of the organic pigments, with the gluing agent, and adhering the organic pigments thereon through the gluing agent coating layer, the obtained particles can show a more excellent light resistance than that of the organic pigments solely. Further, by coating the surface of the inorganic particles having a high surface activity, with the gluing agent, and adhering the organic pigments thereon through the gluing agent coating layer, the surface activity of the obtained particles can be considerably reduced. As a result, it is considered that the road marking material containing the color agent for a road marking material according to the present invention can be inhibited from undergoing the change in hue with the passage of time due to the synergistic effect of the improved light resistance and reduced surface activity of the color agent.

In particular, in the case where the yellow-based organic pigments are adhered, it is possible to obtain a color agent for a road marking material showing a high retroreflective property. Further, in the case where the yellow-based organic pigments are adhered onto the surface of the inorganic particles containing at least titanium oxide particles, it is possible to obtain a color agent for a road marking material which is excellent in not only retroreflective property but also contrast ratio.

The color agent for a road marking material according to the present invention is excellent in tinting strength, hiding power, light resistance and heat resistance and suppressed in surface activity, and further is harmless. Therefore, the color agent of the present invention is suitable as a color agent for a road marking material.

The road marking material of the present invention using the above color agent for a road marking material can be inhibited from undergoing the change in hue with the passage of time, and can show an excellent retroreflective property and, therefore, is suitable as a road marking material that is free from environmental pollution.

EXAMPLES

The present invention will now be described in more detail with reference to the following examples, but the present invention is not restricted to those examples and various modifications are possible within the scope of the present invention.

Various properties were evaluated by the following methods.

(1) The average particle diameter of the particles was expressed by an average value of diameters of 350 particles observed on a micrograph.

(2) The specific surface area was expressed by the value measured by a BET method.

(3) The amounts of Al and Si which were present on the surface of inorganic particles coated with an intermediate coating material, were respectively measured by a fluorescent X-ray spectroscopy device "3063 M-type" (manufactured by RIGAKU DENKI KOGYO CO., LTD.) according to JIS K0119 "General rule of fluorescent X-ray analysis".

(4) The amount of the gluing agent coated on the surface of the inorganic particles, the amount of the organic pigments adhered onto the color agent for a road marking material, and the amount of the fatty acid, fatty acid metal salt or silane-based coupling agent coated on the color agent to be coated, were respectively expressed by the amount of carbon measured by "Horiba Metal, Carbon and Sulfur Analyzer EMIA-2200 Model" (manufactured by HORIBA SEISAKUSHO CO., LTD.).

(5) The hues of the inorganic particles, organic pigments and color agent for a road marking material, were respectively measured by the following method.

That is, 0.5 g of each sample and 0.5 ml of castor oil were intimately kneaded together by a Hoover's muller to form a paste. 4.5 g of clear lacquer was added to the obtained paste and was intimately kneaded to form a paint. The obtained paint was applied on a cast-coated paper by using a 150 μm (6-mil) applicator to produce a coating film piece (having a film thickness of about 30 μm). The thus obtained coating film piece was measured by a spectrocolorimeter "CM-3610d" (manufactured by MINOLTA CO., LTD.) and expressed by color specification values according to JIS Z 8929. Meanwhile, the C* value representing chroma is calculated according to the following formula:

$$C^* = ((a^*)^2 + (b^*)^2)^{1/2}$$

(6) The tinting strength of the color agent for a road marking material was measured by the following method.

That is, a primary color enamel and a vehicle enamel prepared by the below-mentioned method were respectively applied on a cast-coated paper by a 150 μm (6-mil) applicator to produce coating film pieces. The thus obtained coating film pieces were measured by a spectrocolorimeter "CM-3610d" (manufactured by MINOLTA CO., LTD.) to determine L* values thereof. The difference between the obtained L* values was represented by a ΔL* value.

Next, as a standard sample for the color agent for a road marking material, a mixed pigment was prepared by simply mixing the organic pigments and the inorganic particles at the same mixing ratio as used for the production of the color agent for a road marking material. Using the thus prepared mixed pigment as standard sample, the same procedure as defined above was conducted to prepare an primary color enamel and a vehicle enamel, form coating film pieces and measure L* values thereof. The difference between the L* values was represented by a ΔLs* value.

From the obtained ΔL* value of the color agent for a road marking material and ΔLs* value of the standard sample, the tinting strength (%) was calculated according to the following formula:

$$\text{Tinting strength (\%)} = 100 + \{(\Delta Ls^* - \Delta L^*) \times 10\}$$

Preparation of Primary Color Enamel:

10 g of the above sample particles, 16 g of an amino alkyd resin and 6 g of a thinner were blended together. The resultant mixture was added together with 90 g of 3 mmφ glass beads into a 140-ml glass bottle, and then mixed and dispersed for 45 minutes by a paint shaker. The obtained mixture was further mixed with 50 g of an amino alkyd resin, and dispersed for 5 minutes by a paint shaker, thereby obtaining an primary color enamel.

Preparation of Vehicle Enamel:

12 g of the above-prepared primary color enamel and 40 g of Aramic White (titanium dioxide-dispersed amino alkyd resin) were blended together, and the resultant mixture was mixed and dispersed for 15 minutes by a paint shaker, thereby preparing a vehicle enamel.

(7) The hiding powers of the inorganic particles and color agent for a road marking material were measured by the cryptometer method according to JIS K5101-8.2 using the above-prepared primary color enamel.

(8) The light resistances of the inorganic particles, organic pigments and color agent for a road marking material were measured by the following method.

That is, the same primary color enamel as prepared above for the measurement of tinting strength, was applied at a thickness of 150 μm onto a cold-rolled steel plate (0.8 mm×70 mm×150 mm; JIS G-3141) and dried to form a coating film. One half of the thus prepared test specimen was covered with a metal foil, and an ultraviolet light was continuously irradiated over the test specimen at an intensity of 100 mW/cm² for 6 hours using "EYE SUPER UV TESTER SUV-W13" (manufactured by IWASAKI DENKI CO., LTD.). Then, the hues (L*, a* and b* values) of the metal foil-covered non-irradiated portion and the UV-irradiated portion of the test specimen were respectively measured. The ΔE* value was calculated from differences between the measured hue values of the metal foil-covered non-irradiated portion and the UV-irradiated portion according to the following formula:

$$\Delta E^* = [(\Delta L^*)^2 + (\Delta a^*)^2 + (\Delta b^*)^2]^{1/2}$$

wherein ΔL* represents the difference between L* values of the non-irradiated and UV-irradiated portions; Δa* represents the difference between a* values of the non-irradiated and UV-irradiated portions; and Δb* represents the difference between b* values of the non-irradiated and UV-irradiated portions.

(9) The surface activity of the color agent for a road marking material was evaluated by measuring the amount of residual solvent by the following method.

First, 1 g of sample particles and 10 g of a solvent (MEK) were weighed. Then, the sample particles were immersed in the solvent for 3 hours, air-dried for 24 hours and further dried at 60° C. for 24 hours. The amount of carbon contained in the thus dried sample particles was measured using "Horiba Metal, Carbon and Sulfur Analyzer EMIA-2200 Model" (manufactured by HORIBA SEISAKUSHO CO., LTD.) to determine the amount of residual carbon therein. The smaller amount of the residual carbon represents the smaller amount of the residual solvent contained in the particles, namely a less surface activity of the particles.

(10) The heat resistance of the color agent for a road marking material was expressed by the temperature which was read at a crossing point of two tangential lines respectively drawn on two curves constituting the first one of two inflection points which form a peak on a DSC chart prepared by subjecting the color agent to differential scanning calorimetry (DSC) using a thermal analyzer "SSC-5000", (manufactured by SEIKO DENSHI KOGYO CO., LTD.).

(11) The desorption percentage (%) of the organic pigments desorbed from the color agent for a road marking material was measured by the following method. The closer to 0% the desorption percentage, the smaller the amount of the organic pigments desorbed from the surface of particles of the color agent for a road marking material.

That is, 3 g of the particles to be measured and 40 ml of ethanol were placed in a 50-ml precipitation tube and then subjected to ultrasonic dispersion for 20 minutes. Thereafter, the obtained dispersion was allowed to stand for 120 minutes to separate the desorbed organic pigments from the particles on the basis of the difference in specific gravity between the organic pigments and the particles. Next, the particles were mixed again with 40 ml of ethanol and then subjected to ultrasonic dispersion for 20 minutes. Thereafter, the obtained dispersion was allowed to stand for 120 minutes to separate the desorbed organic pigments from the particles. The thus separated particles were dried at 100° C. for one hour, and the amount of carbon contained in the particles was measured by "Horiba Metal, Carbon and Sulfur Analyzer EMIA-2200 Model" (manufactured by HORIBA SEISAKUSHO CO., LTD.). The desorption percentage (%) of the organic pigments was calculated according to the following formula:

Desorption percentage of organic pigments (%)={$(W_a-W_e)/W_a$}×100 wherein $W_a$ represents an amount of organic pigments initially adhered onto the color agent for a road marking material; and $W_e$ represents an amount of organic pigments still adhered on the color agent for a road marking material after desorption test.

(12) The contrast ratio of the road marking material was measured by the following method.

That is, a test specimen was prepared using each paint produced by the below-mentioned method according to JIS K 5665. The tristimulus values of the thus prepared test specimen were measured by a reflectometer according to JIS Z8722 to calculate the contrast ratio from the measured values.

(13) The alkali resistance of the road marking material was evaluated by the following method.

That is, a test specimen was produced using each paint prepared by the below-mentioned method, and evaluated according to JIS K 5665. Further, the hues (L*, a* and b* values) thereof before and after the immersion in an aqueous alkali solution were respectively measured. The ΔE* value was calculated from the difference between the hue values before and after the immersion in an aqueous alkali solution according to the following formula:

$$\Delta E^* = [(\Delta L^*)^2 + (\Delta a^*)^2 + (\Delta b^*)^2]^{1/2}$$

wherein ΔL* represents the difference between L* values of the test specimen before and after the alkali immersion treatment; Δa* represents the difference between a* values of the test specimen before and after the alkali immersion treatment; and Δb* represents the difference between b* values of the test specimen before and after the alkali immersion treatment.

Using the thus obtained ΔE* value, the alkali resistance of the road marking material was evaluated on the basis of the following five ranks.

Rank 5: Test specimen was free from swells, cracks, peelings and pinholes, and ΔE* value thereof was not more than 3.0;

Rank 4: Test specimen was free from swells, cracks, peelings and pinholes, and ΔE* value thereof was not more than 4.0;

Rank 3: Test specimen was free from swells, cracks, peelings and pinholes, and ΔE* value thereof was not more than 5.0;

Rank 2: Test specimen was free from swells, cracks, peelings and pinholes, and ΔE* value thereof was more than 5.0; and Rank 1: Test specimen suffered from swells, cracks, peelings and pinholes.

(14) The abrasion resistance of the road marking material was measured as follows. That is, a test specimen was produced using each paint prepared by the below-mentioned method. The abrasion resistance of the thus produced test specimen was measured according to JIS K 5665.

(15) The light resistance of the road marking material was measured by the following method.

That is, one half of a test specimen produced by coating each paint prepared by the below-mentioned method on a glass plate (about 200×100×2 mm), was covered with a metal foil, and an ultraviolet light was continuously irradiated over the test specimen at an intensity of 100 mW/cm² for 6 hours using "EYE SUPER UV TESTER (SUV-W13)" (manufactured by IWASAKI DENKI CO., LTD.). Then, the hues (L*, a* and b* values) of the metal foil-covered non-irradiated portion and the UV-irradiated portion of the test specimen were respectively measured. The ΔE* value was calculated from the difference between the measured hue values of the metal foil-covered non-irradiated portion and the UV-irradiated portion according to the above-described formula.

(16) The aging resistance of the road marking material was measured by the following method.

That is, a test specimen was produced by coating each paint prepared by the below-mentioned method on a glass plate (about 200×100×2 mm), and allowed to stand under environmental conditions having a temperature of 60° C. and a relative humidity of 90% for one month. The hues (L*, a* and b* values) of the test specimen before and after the aging test were measured. The aging resistance of the test specimen was represented by the ΔE* value calculated from the difference between the measured hue values according to the following formula:

$$\Delta E^* = [(\Delta L^*)^2 + (\Delta a^*)^2 + (\Delta b^*)^2]^{1/2}$$

wherein ΔL* represents the difference between L* values before and after the aging test; Δa* represents the difference between a* values before and after the aging test; and Δb* represents the difference between b* values before and after the aging test.

(17) The retroreflective property of the road marking material was evaluated by the following method.

That is, a test specimen was produced by coating each paint prepared by the below-mentioned method on a glass plate (about 200×100×2 mm). The thus produced test specimen was placed on a black cloth within a dark room, and irradiated with a light at an angle of about 30° from a 30 W fluorescent lamp disposed at a distance of 2 m from the test specimen. The retroreflective property of the test specimen was evaluated on the basis of the following four ranks.

Rank 4: Sufficient retroreflective property (yellowish);
Rank 3: Some retroreflective property (slightly whitish);
Rank 2: Slight retroreflective property (whitish); and
Rank 1: No retroreflective property (white).

Example 1

<Production of Color Agent for a Road Marking Material>

20 kg of titanium oxide particles (particle shape: granular shape; average particle diameter: 0.238 μm; BET specific surface area value: 11.6 m$^2$/g; L* value: 96.31, a* value: 1.06, b* value: −1.66 and C* value: 1.97; hiding power: 1,490 cm$^2$/g; refractive index: 2.71; light resistance (ΔE* value): 6.86) were deaggregated in 150 liters of pure water using a stirrer, and further passed through a TK pipeline homomixer (manufactured by TOKUSHU KIKA KOGYO CO., LTD.) three times, thereby obtaining a slurry containing the titanium oxide particles.

Successively, the obtained slurry containing the titanium oxide particles was passed through a transverse-type sand grinder (tradename "MIGHTY MILL MHG-1.5L", manufactured by INOUE SEISAKUSHO CO., LTD.) five times at an axis-rotating speed of 2,000 rpm, thereby obtaining a slurry in which the titanium oxide particles were dispersed.

The titanium oxide particles in the obtained slurry, which remained on a sieve of 325 meshes (mesh size: 44 μm) was 0%. The slurry was filtered and washed with water, thereby obtaining a wet cake composed of the titanium oxide particles. The obtained wet cake composed of the titanium oxide particles was dried at 120° C. 11.0 kg of the dried particles were then charged into an edge runner (tradename "MPUV-2 Model", manufactured by MATSUMOTO CHUZO TEKKO-SHO CO., LTD.), and mixed and stirred at 294 N/cm (30 Kg/cm) for 30 minutes, thereby lightly deaggregating the particles.

Then, 110 g of methyltriethoxysilane (tradename "TSL8123" produced by GE TOSHIBA SILICONE CO., LTD.) was added to the deaggregated titanium oxide particles while operating the edge runner. The titanium oxide particles were continuously mixed and stirred at a linear load of 588 N/cm (60 Kg/cm) and a stirring speed of 22 rpm for 30 minutes.

Next, 4,400 g of organic pigments Y-1 (kind: disazo-based organic yellow pigments; particle shape: granular shape; average particle diameter: 0.15 μm; BET specific surface area value: 41.7 m$^2$/g; L* value: 69.51, a* value: 38.31 and b* value: 76.96; light resistance (ΔE* value): 18.25) were added to the titanium oxide particles coated with methyltriethoxysilane for 10 minutes while operating the edge runner. Further, the particles were continuously mixed and stirred at a linear load of 392 N/cm (40 Kg/cm) and a stirring speed of 22 rpm for 30 minutes. Successively, 110 g of organic pigments R-1 (kind: condensed polycyclic-type organic red pigments; particle shape: granular shape; average particle diameter: 0.10 μm; BET specific surface area value: 89.8 m$^2$/g; L* value: 37.81, a* value: 44.03 and b* value: 24.09; light resistance (ΔE* value): 15.47) were added to the above-obtained particles for 10 minutes while operating the edge runner. Further, the resultant particles were continuously mixed and stirred at a linear load of 392 N/cm (40 Kg/cm) and a stirring speed of 22 rpm for 20 minutes, thereby successively adhering the organic pigments Y-1 and R-1 on the coating layer composed of methyltriethoxysilane. Then, the thus obtained coated particles were heat-treated at 105° C. for 60 minutes by using a drier, thereby obtaining composite particles.

The color agent for a road marking material composed of the thus obtained composite particles was in the form of granular particles having an average particle diameter of 0.240 μm. In addition, the color agent for a road marking material showed a BET specific surface area value of 16.4 m$^2$/g, a lightness (L* value) of 68.59, a tinting strength of 137%, a hiding power of 1,405 cm$^2$/g, a surface activity of 1.14%, a heat resistance of 235° C. and a light resistance (ΔE* value) of 2.41. The desorption percentage of the organic pigments from the color agent for a road marking material was 7.4%. The amount of a coating organosilane compounds produced from methyltriethoxysilane was 0.07% by weight (calculated as C), and the amount of the organic pigment coat formed on the coating layer composed of the organosilane compounds produced from methyltriethoxysilane was 16.52% by weight (calculated as C) (the total amount of the organic pigments Y-1 and R-1 adhered corresponded to 41 parts by weight based on 100 parts by weight of the titanium oxide particles).

As a result of observing the micrograph, since no organic pigments was recognized from the micrograph, it was confirmed that a substantially whole amount of the organic pigments added contributed to the formation of the organic pigment coat on the coating layer composed of the organosilane compounds produced from methyltriethoxysilane.

<Production of Road Marking Paint (First Class) Containing Color Agent for a Road Marking Material>

Base materials for road marking paint including the color agent for a road marking material were blended with each other at the following mixing ratio, and kneaded together using a ball mill, thereby obtaining a road marking paint (first class).

Composition:

| | |
|---|---|
| Color agent for a road marking material | 15.0 parts by weight |
| Amino alkyd resin | 16.0 parts by weight |
| Additives | 3.0 parts by weight |
| Solvent (toluene) | 35.0 parts by weight |
| Heavy calcium carbonate | 15.0 parts by weight |
| Talc | 16.0 parts by weight |

A test specimen was prepared using the thus obtained road marking paint, and subjected to various tests.

As a result, it was confirmed that the obtained road marking material had a contrast ratio of 0.97, an alkali resistance of the rank 5, an abrasion resistance of 310 mg, a light resistance (ΔE* value) of 3.19, an aging resistance (ΔE* value) of 1.94 and a retroreflective property of the rank 4.

<Production of Road Marking Paint (Second Class) Containing Color Agent for a Road Marking Material>

Base materials for road marking paint including the color agent for a road marking material were blended with each other at the following mixing ratio, and kneaded together using a ball mill, thereby obtaining a road marking paint (second class).

Composition:

| | |
|---|---|
| Color agent for a road marking material | 15.0 parts by weight |
| Amino alkyd resin | 16.0 parts by weight |
| Additives | 3.0 parts by weight |
| Solvent (toluene) | 25.0 parts by weight |

-continued

| Heavy calcium carbonate | 16.0 parts by weight |
|---|---|
| Talc | 25.0 parts by weight |

A test specimen was prepared using the thus obtained road marking paint, and subjected to various tests.

As a result, it was confirmed that the obtained road marking material had a contrast ratio of 0.98, an alkali resistance of the rank 5, an abrasion resistance of 277 mg, a light resistance ($\Delta E^*$ value) of 3.16, an aging resistance ($\Delta E^*$ value) of 1.92 and a retroreflective property of the rank 4.

<Production of Road Marking Paint (Third Class) Containing Color Agent for a Road Marking Material>

Base materials for road marking paint including the color agent for a road marking material were blended with each other at the following mixing ratio, and heat-kneaded together at a temperature of 160 to 190° C., thereby obtaining a road marking paint (third class).

Composition:

| Color agent for a road marking material | 5.0 parts by weight |
|---|---|
| Petroleum resin | 12.0 parts by weight |
| Rosin-modified maleic resin | 6.0 parts by weight |
| Plasticizer | 3.0 parts by weight |
| Glass beads | 16.0 parts by weight |
| Heavy calcium carbonate | 38.0 parts by weight |
| Crystalline limestone (Kansuiseki) | 20.0 parts by weight |

A test specimen was prepared using the thus obtained road marking paint, and subjected to various tests.

As a result, it was confirmed that the obtained road marking material had an alkali resistance of the rank 5, an abrasion resistance of 145 mg, a light resistance ($\Delta E^*$ value) of 3.01, an aging resistance ($\Delta E^*$ value) of 1.89 and a retroreflective property of the rank 4.

Core Particles 1 to 7:

Inorganic particles as core particles 1 to 7 having properties shown in Table 1 were prepared.

Core Particles 8:

A slurry containing titanium oxide particles was obtained by dispersing 20 kg of titanium oxide particles (core particles 1) in 150 liters of water. The pH value of the thus obtained re-dispersed slurry containing the titanium oxide particles was adjusted to 10.5 by using an aqueous sodium hydroxide solution, and then the concentration of the solids in the slurry was adjusted to 98 g/liter by adding water thereto. After 150 liters of the slurry was heated to 60° C., 5,444 ml of a 1.0 mol/liter sodium aluminate solution (corresponding to 1.0% by weight (calculated as Al) based on the weight of the titanium oxide particles) was added to the slurry. After allowing the obtained slurry to stand for 30 minutes, the pH value of the slurry was adjusted to 7.5 by using acetic acid. After further allowing the resultant slurry to stand for 30 minutes, the slurry was subjected to filtration, washing with water, drying and pulverization, thereby obtaining the titanium oxide particles whose surface was coated with hydroxides of aluminum.

The essential production conditions are shown in Table 2, and various properties of the obtained surface-treated titanium oxide particles are shown in Table 3.

Core Particles 9 to 14:

The same procedure as defined for the production of the above core particles 8, was conducted except that the core particles 2 to 7 were respectively used instead of the core particles 1, and kinds and amounts of coating materials were changed variously, thereby obtaining inorganic particles whose surface was coated with the coating material.

The essential production conditions are shown in Table 2, and various properties of the obtained surface-treated inorganic particles are shown in Table 3.

Meanwhile, in Tables, "A" and "S" as described in "kind of coating material used in surface-treating step" represent hydroxides of aluminum and oxides of silicon, respectively.

Organic Pigments:

Organic pigments having properties as shown in Table 4 were prepared.

Examples 2 to 17 and Comparative Examples 1 and 2

The same procedure as defined in Example 1 was conducted except that kinds and amounts of gluing agents added in coating step with gluing agent, linear load and treating time for edge runner treatment used in the coating step with gluing agent, kinds and amounts of organic pigments adhered in organic pigment-adhering step, and linear load and treating time for edge runner treatment used in the organic pigment-adhering step, were changed variously, thereby obtaining color agents for road marking material.

The essential production conditions are shown in Table 5, and various properties of the obtained color agents for road marking material are shown in Table 6.

Meanwhile, in Example 4, 100.0 parts by weight of the core particles were first mixed with 20.0 parts by weight of the organic pigments Y-2 and then with 0.6 part by weight of the organic pigments R-1 while operating the edge runner. In Example 5, the organic pigments Y-1 was added six times in an amount of 25.0 parts by weight each such that the total amount of the organic pigment Y-1 added was 150.0 parts by weight based on 100 parts by weight of the core particles. In Example 6, 100.0 parts by weight of the organic pigment R-1 were continuously added to 100.0 parts by weight of the core particles for 100 minutes. In Example 9, 100 parts by weight of the core particles were first mixed with 60.0 parts by weight of the organic pigments Y-1 and then with 1.5 parts by weight of the organic pigments R-2 while operating the edge runner.

Further, in Example 16, mixed particles containing 57.5 parts by weight of the core particles 1, 17.7 parts by weight of the core particles 4 and 24.8 parts by weight of the core particles 5 were used as the core particles. In Example 17, mixed particles containing 50.0 parts by weight of the core particles 5 and 50.0 parts by weight of the core particles 8 were used as the core particles.

Comparative Example 3

Follow-Up Test of Example 1 of Japanese Patent Application Laid-Open (KOKAI) No. 4-132770(1992)

0.066 mol of acetoaceto-2,5-dimethoxy-chloroanilide was dissolved in 300 ml of water using an equimolar amount of sodium hydroxide so as to adjust the total amount of the resultant solution to 500 ml. 24.5 g of titanium oxide particles (core particles 1) were added to the solution while stirring, and then 100 ml of 0.15 mol acetic acid was dropped into the solution, thereby preparing a coupler solution. Successively, 250 ml of a tetrazolated solution containing 0.03 mol of 3,3-dichlorobenzidine was dropped into the coupler solution for about 2 hours. After completion of the dropping, the resultant solution was heated to 90° C., and continuously stirred for 60 minutes. Then, the obtained solution was filtered, washed with water and dried at 90° C., thereby obtaining composite particles. It was confirmed that the thus produced organic pigments were disazo-based pigments (C. I. Pigment Yellow 83), and the composite particles were composed of the inorganic pigments and organic pigments at a ratio of 1:1.

Comparative Example 4

Follow-Up Test of Example 2 of Japanese Patent Application Laid-Open (KOKAI) No. 7-331113(1995)

Respective raw materials shown below were blended with each other at the following mixing ratio using a High-speed mixer, thereby producing a pigment composition. Specifically, the raw materials were stirred and mixed together under room temperature condition at an axis-rotating speed of 1,000 rpm for 45 minutes, and then the obtained pigment composition was taken out of the mixer.

Composition of Raw Materials:

| | |
|---|---|
| Organic pigments Y-2 (condensed polycyclic-type yellow pigments) | 41.0 parts by weight |
| Organic pigments R-1 (condensed polycyclic-type red pigments) | 1.5 parts by weight |
| Core particles 1 (titanium oxide) | 32.5 parts by weight |
| Core particles 4 (calcium carbonate) | 10.0 parts by weight |
| Core particles 5 (precipitated barium sulfate) | 14.0 parts by weight |
| Silane-based coupling agent | 1.0 part by weight |

Various properties of the color agents obtained in Comparative Examples 3 and 4 are shown in Table 6.

Example 18

<Color Agent for a Road Marking Material Having a Plurality of Coloring Adhesion Layers>

20 kg of titanium oxide particles (core particles 1) were deaggregated in 150 liters of pure water using a stirrer, and further passed through a TK pipeline homomixer (manufactured by TOKUSHU KIKA KOGYO CO., LTD.) three times, thereby obtaining a slurry containing the titanium oxide particles.

Successively, the obtained slurry containing the titanium oxide particles was passed through a transverse-type sand grinder (tradename "MIGHTY MILL MHG-1.5L", manufactured by INOUE SEISAKUSHO CO., LTD.) five times at an axis-rotating speed of 2,000 rpm, thereby obtaining a slurry in which the titanium oxide particles were dispersed.

The titanium oxide particles in the obtained slurry, which remained on a sieve of 325 meshes (mesh size: 44 μm) was 0%. The slurry was filtered and washed with water, thereby obtaining a wet cake composed of the titanium oxide particles. The obtained wet cake composed of the titanium oxide particles was dried at 120° C. 11.0 kg of the dried particles were then charged into an edge runner (tradename "MPUV-2 Model", manufactured by MATSUMOTO CHUZO TEKKO-SHO CO., LTD.), and mixed and stirred at 294 N/cm (30 Kg/cm) for 30 minutes, thereby lightly deaggregating the particles.

Then, 220 g of methylhydrogenpolysiloxane (tradename "TSF484" produced by GE TOSHIBA SILICONE CO., LTD.) was added to the deaggregated titanium oxide particles while operating the edge runner. The titanium oxide particles were continuously mixed and stirred at a linear load of 588 N/cm (60 Kg/cm) and a stirring speed of 22 rpm for 20 minutes.

Next, 5,500 g of the organic pigments Y-1 were added to the titanium oxide particles coated with methylhydrogenpolysiloxane for 20 minutes while operating the edge runner. Further, the particles were continuously mixed and stirred at a linear load of 588 N/cm (60 Kg/cm) and a stirring speed of 22 rpm for 30 minutes, thereby obtaining intermediate particles 1 having an organic pigment coat composed of the organic pigments Y-1 which was adhered onto the coating layer composed of methylhydrogenpolysiloxane.

In order to determine the amount of the coating layer composed of methylhydrogenpolysiloxane and the amount of the organic pigments Y-1 adhered thereonto, a part of the obtained intermediate particles 1 were sampled, and heat-treated at 105° C. for 60 minutes using a dryer. As a result, it was confirmed that the amount of the coating layer composed of methylhydrogenpolysiloxane was 0.53% by weight (calculated as C), and the amount of the organic pigments Y-1 adhered thereonto was 19.08% by weight (calculated as C; corresponding to 50 parts by weight based on 100 parts by weight of the titanium oxide particles). As a result of observing the micrograph, since no organic pigments Y-1 were recognized from the micrograph, it was confirmed that a substantially whole amount of the organic pigments Y-1 added contributed to the formation of the organic pigment coat on the coating layer composed of methylhydrogenpolysiloxane.

Then, 220 g of dimethylpolysiloxane (tradename "TSF451" produced by GE TOSHIBA SILICONE CO., LTD.) was added to the intermediate particles 1 while operating the edge runner. The particles were continuously mixed and stirred at a linear load of 588 N/cm (60 Kg/cm) and a stirring speed of 22 rpm for 30 minutes, thereby obtaining the intermediate particles 1 whose surface was coated with a coating layer composed of dimethylpolysiloxane.

Next, 165 g of the organic pigments R-1 were added to the resultant particles for 20 minutes while operating the edge runner. Further, the particles were continuously mixed and stirred at a linear load of 294 N/cm (30 Kg/cm) and a stirring speed of 22 rpm for 20 minutes, thereby adhering the organic pigments R-1 onto the adhesion layer composed of the organic pigments Y-1 through the coating layer composed of dimethylpolysiloxane. Thereafter, the thus obtained composite particles were heat-treated at 105° C. for 60 minutes, thereby obtaining a color agent for a road marking material.

As a result of observing the micrograph, since no organic pigments R-1 were recognized from the micrograph, it was confirmed that a substantially whole amount of the organic pigments R-1 added contributed to the formation of the organic pigment coat on the coating layer composed of dimethylpolysiloxane.

The essential production conditions are shown in Tables 7 and 8, and various properties of the obtained color agents for road marking material in the form of composite particles are shown in Table 9.

Examples 19 to 24

The same procedure as defined in Example 18 was conducted except that kinds of core particles used upon formation of the first coloring adhesion layer, kinds and amounts of gluing agents added in gluing agent-coating step upon formation of the first coloring adhesion layer, linear load and treating time for edge runner treatment used in the gluing agent-coating step upon formation of the first coloring adhesion layer, kinds and amounts of organic pigments adhered in organic pigment-adhering step upon formation of the first coloring adhesion layer, and linear load and treating time for edge runner treatment used in the organic pigment-adhering step upon formation of the first coloring adhesion layer, as well as kinds of intermediate particles used upon formation of the second coloring adhesion layer, kinds and amounts of gluing agents added in gluing agent-coating step upon formation of the second coloring adhesion layer, linear load and treating time for edge runner treatment used in the gluing agent-coating step upon formation of the second coloring adhesion layer, kinds and amounts of organic pigments adhered in organic pigment-adhering step upon formation of the second coloring adhesion layer, and linear load and treating time for edge runner treatment used in the organic pigment-adhering step upon formation of the second coloring adhesion layer, were changed variously, thereby obtaining color agents for road marking material.

Meanwhile, in the intermediate particles 7, mixed particles containing 50.0 parts by weight of the core particles and 50.0 parts by weight of the core particles 4 were used as the core particles.

The essential production conditions are shown in Tables 7 and 8, and various properties of the obtained color agents for road marking material in the form of composite particles are shown in Table 9.

Example 25

2 kg of the color agent for a road marking material obtained in Example 5 was mixed with 100 g of 2-ethyl hexanoic acid. The resultant mixture was heated up to 120° C. for 30 minutes while stirring using a Henschel mixer, and then allowed to stand at 120° C. for 30 minutes. Thereafter, the mixture was cooled to room temperature for 30 minutes, thereby obtaining a surface-coated color agent for a road marking material.

The essential production conditions are shown in Table 10, and various properties of the obtained surface-coated color agents for road marking material are shown in Table 11.

Examples 26 to 31

The same procedure as defined in Example 25 was conducted except that kinds of color agents for road marking material, kinds and amounts of coating materials composed of a fatty acid, a fatty acid metal salt or a coupling agent, and kneading temperature and kneading time used in coating step using the Henschel mixer, were changed variously, thereby obtaining color agents for road marking material whose surface was coated with the coating material.

The essential production conditions are shown in Table 10, and various properties of the obtained surface-coated color agents for road marking material are shown in Table 11.

Examples 32 to 62 and Comparative Examples 5 to 10

<Road Marking Paint (First Class)>

The same procedure as defined in Example 1 was conducted except that kinds of color agents for road marking material were changed variously, thereby obtaining road marking paints (first class).

The essential production conditions are shown in Tables 12 and 13, and various properties of the obtained road marking paints (first class) are shown in Tables 14 and 15.

Examples 63 to 93 and Comparative Examples 11 to 16

<Road Marking Paint (Second Class)>

The same procedure as defined in Example 1 was conducted except that kinds of color agents for road marking material were changed variously, thereby obtaining road marking paints (second class).

The essential production conditions are shown in Tables 16 and 17, and various properties of the obtained road marking paints (second class) are shown in Tables 18 and 19.

Examples 94 to 124 and Comparative Examples 17 to 22

<Road Marking Paint (Third Class)>

The same procedure as defined in Example 1 was conducted except that kinds of color agents for road marking material were changed variously, thereby obtaining road marking paints (third class).

The essential production conditions are shown in Tables 20 and 21, and various properties of the obtained road marking paints (third class) are shown in Tables 22 and 23.

TABLE 1

| | Properties of inorganic particles | | | |
|---|---|---|---|---|
| Kind of core particles | Kind | Shape | Average particle diameter (μm) | BET specific surface area value ($m^2/g$) |
| Core particles 1 | Titanium oxide | Granular | 0.253 | 10.3 |
| Core particles 2 | Titanium oxide | Granular | 0.053 | 61.2 |
| Core particles 3 | Zinc oxide | Granular | 0.183 | 18.3 |
| Core particles 4 | Calcium carbonate | Granular | 0.140 | 18.6 |
| Core particles 5 | Precipitated barium sulfate | Granular | 0.501 | 7.4 |
| Core particles 6 | Silica | Spherical | 0.603 | 3.8 |
| Core particles 7 | Goethite | Spindle-shaped | 0.402 | 19.8 |

| | Properties of inorganic particles | | | |
|---|---|---|---|---|
| | Hue | | | |
| Kind of core particles | L* value (—) | a* value (—) | b* value (—) | C* value (—) |
| Core particles 1 | 96.26 | −0.64 | −0.81 | 1.03 |

TABLE 1-continued

| Core particles | | | | |
|---|---|---|---|---|
| Core particles 2 | 95.02 | 0.11 | 0.07 | 0.13 |
| Core particles 3 | 90.18 | -2.22 | 3.76 | 4.37 |
| Core particles 4 | 93.48 | -0.07 | 0.94 | 0.94 |
| Core particles 5 | 91.88 | -0.46 | 3.25 | 3.29 |
| Core particles 6 | 92.97 | 0.06 | 0.52 | 0.52 |
| Core particles 7 | 60.35 | 14.57 | 53.28 | 55.24 |

Properties of inorganic particles

| Kind of core particles | Hiding power (cm²/g) | Refractive index (—) | Light resistance (ΔE* value) (—) |
|---|---|---|---|
| Core particles 1 | 1,560 | 2.71 | 6.13 |
| Core particles 2 | 524 | 2.71 | 10.15 |
| Core particles 3 | 730 | 2.03 | 5.84 |
| Core particles 4 | 46 | 1.52 | 6.99 |
| Core particles 5 | 63 | 1.62 | 6.17 |
| Core particles 6 | 122 | 1.40 | 5.36 |
| Core particles 7 | 1,880 | 2.08 | 6.80 |

TABLE 2

| Core particles | Kind of core particles | Surface-treating step Additives | | |
|---|---|---|---|---|
| | | Kind | Calculated as | Amount (wt. %) |
| Core particles 8 | Core particles 1 | Sodium aluminate | Al | 1.0 |
| Core particles 9 | Core particles 2 | Sodium aluminate | Al | 1.5 |
| | | Water glass #3 | SiO₂ | 1.0 |
| Core particles 10 | Core particles 3 | Water glass #3 | SiO₂ | 1.0 |
| Core particles 11 | Core particles 4 | Sodium aluminate | Al | 2.0 |
| Core particles 12 | Core particles 5 | Sodium aluminate | Al | 2.0 |
| | | Water glass #3 | SiO₂ | 0.5 |
| Core particles 13 | Core particles 6 | Aluminum sulfate | Al | 2.0 |
| Core particles 14 | Core particles 7 | Aluminum sulfate | Al | 1.0 |

| Core particles | Surface-treating step Coating material | | |
|---|---|---|---|
| | Kind | Calculated as | Amount (wt. %) |
| Core particles 8 | A | Al | 0.98 |
| Core particles 9 | A | Al | 1.48 |
| | S | SiO₂ | 0.99 |
| Core particles 10 | S | SiO₂ | 0.98 |
| Core particles 11 | A | Al | 1.96 |

TABLE 2-continued

| Core particles 12 | A | Al | 1.93 |
|---|---|---|---|
| | S | SiO₂ | 0.47 |
| Core particles 13 | A | Al | 1.96 |
| Core particles 14 | A | Al | 0.97 |

TABLE 3

Properties of surface-treated inorganic particles

| Kind of core particles | Average particle diameter (μm) | BET specific surface area value (m²/g) |
|---|---|---|
| Core particles 8 | 0.254 | 12.1 |
| Core particles 9 | 0.054 | 60.8 |
| Core particles 10 | 0.184 | 18.0 |
| Core particles 11 | 0.140 | 17.3 |
| Core particles 12 | 0.502 | 8.1 |
| Core particles 13 | 0.610 | 4.6 |
| Core particles 14 | 0.402 | 19.5 |

Properties of surface-treated inorganic particles Hue

| Kind of core particles | L* value (—) | a* value (—) | b* value (—) | C* value (—) |
|---|---|---|---|---|
| Core particles 8 | 96.21 | -0.52 | -0.70 | 0.87 |
| Core particles 9 | 95.02 | 0.10 | 0.15 | 0.18 |
| Core particles 10 | 89.33 | -2.01 | 5.03 | 5.42 |
| Core particles 11 | 93.06 | 0.07 | 0.88 | 0.88 |
| Core particles 12 | 91.76 | -0.44 | 3.21 | 3.24 |
| Core particles 13 | 92.99 | 0.05 | 0.82 | 0.82 |
| Core particles 14 | 60.37 | 14.83 | 55.04 | 57.00 |

Properties of surface-treated white inorganic particles

| Kind of core particles | Hiding power (cm²/g) | Refractive index (—) | Light resistance (ΔE* value) (—) |
|---|---|---|---|
| Core particles 8 | 1,480 | 2.71 | 5.83 |
| Core particles 9 | 519 | 2.71 | 8.32 |
| Core particles 10 | 721 | 2.00 | 5.12 |
| Core particles 11 | 48 | 1.53 | 6.97 |
| Core particles 12 | 60 | 1.62 | 5.81 |
| Core particles 13 | 120 | 1.41 | 5.06 |
| Core particles 14 | 1,237 | 2.08 | 6.74 |

TABLE 4

| Organic pigments | Properties of organic pigments Kind |
|---|---|
| Organic pigments Y-1 | Pigment yellow (disazo-based pigments) |
| Organic pigments Y-2 | Pigment yellow (condensed polycyclic-type pigments) |
| Organic pigments R-1 | Pigment red (condensed polycyclic-type pigments) |
| Organic pigments R-2 | Pigment red (azo rake-based pigments) |
| Organic pigments B-1 | Pigment blue (phthalocyanine-based pigments) |

| | Properties of organic pigments | | |
|---|---|---|---|
| Organic pigments | Particle shape | Average particle diameter ($\mu m$) | BET specific surface area value ($m^2/g$) |
| Organic pigments Y-1 | Granular | 0.15 | 41.7 |
| Organic pigments Y-2 | Granular | 0.06 | 63.0 |
| Organic pigments R-1 | Granular | 0.10 | 89.8 |
| Organic pigments R-2 | Granular | 0.20 | 43.3 |
| Organic pigments B-1 | Granular | 0.06 | 71.6 |

| | Properties of organic pigments | | | |
|---|---|---|---|---|
| | Hue | | | Light resistance |
| Organic pigments | $L^*$ value (—) | $a^*$ value (—) | $b^*$ value (—) | ($\Delta E^*$ value) (—) |
| Organic pigments Y-1 | 69.51 | 38.31 | 76.96 | 18.25 |
| Organic pigments Y-2 | 66.90 | 35.11 | 71.94 | 15.70 |
| Organic pigments R-1 | 37.81 | 44.03 | 24.09 | 15.47 |
| Organic pigments R-2 | 42.64 | 42.36 | 30.96 | 17.92 |
| Organic pigments B-1 | 18.02 | 9.65 | −23.57 | 10.83 |

TABLE 5

| Examples and Comparative Examples | Kind of core particles |
|---|---|
| Example 2 | Core particles 1 |
| Example 3 | Core particles 2 |
| Example 4 | Core particles 3 |
| Example 5 | Core particles 4 |
| Example 6 | Core particles 5 |
| Example 7 | Core particles 6 |
| Example 8 | Core particles 7 |
| Example 9 | Core particles 8 |
| Example 10 | Core particles 9 |
| Example 11 | Core particles 10 |
| Example 12 | Core particles 11 |
| Example 13 | Core particles 12 |
| Example 14 | Core particles 13 |
| Example 15 | Core particles 14 |
| Example 16 | Core particles 1, 4 and 5 |
| Example 17 | Core particles 5 and 8 |
| Comparative Example 1 | Core particles 1 |
| Comparative Example 2 | Core particles 1 |

TABLE 5-continued

| | Production of color agent for road making material Coating step with gluing agent | |
|---|---|---|
| Examples and Comparative Examples | Additives | |
| | Kind | Amount added (wt. part) |
| Example 2 | Methyltriethoxysilane | 2.0 |
| Example 3 | Isopropyltriisostearoyl titanate | 1.0 |
| Example 4 | Phenyltriethoxysilane | 1.0 |
| Example 5 | Methylhydrogenpolysiloxane | 2.0 |
| Example 6 | γ-aminopropyltriethoxysilane | 1.5 |
| Example 7 | Methyltrimethoxysilane | 2.0 |
| Example 8 | Phenyltriethoxysilane | 2.0 |
| Example 9 | Methylhydrogenpolysiloxane | 1.0 |
| Example 10 | Dimethyldimethoxysilane | 1.5 |
| Example 11 | Polyvinyl alcohol | 5.0 |
| Example 12 | Methyltriethoxysilane | 1.5 |
| Example 13 | Methyltrimethoxysilane | 3.0 |
| Example 14 | γ-aminopropyltriethoxysilane | 5.0 |
| Example 15 | Phenyltriethoxysilane | 2.0 |
| Example 16 | Methyltriethoxysilane | 2.0 |
| Example 17 | Methyltriethoxysilane | 2.0 |
| Comparative Example 1 | — | — |
| Comparative Example 2 | Methyltriethoxysilane | 2.0 |

| | Production of color agent for road making material Coating step with gluing agent | | | |
|---|---|---|---|---|
| Examples and Comparative Examples | Edge runner treatment | | | Coating amount |
| | Linear load | | Time | Calculated as C |
| | (N/cm) | (Kg/cm) | (min.) | (wt. %) |
| Example 2 | 588 | 60 | 30 | 0.13 |
| Example 3 | 588 | 60 | 20 | 0.75 |
| Example 4 | 441 | 45 | 30 | 0.36 |
| Example 5 | 588 | 60 | 30 | 0.53 |
| Example 6 | 392 | 40 | 30 | 0.24 |
| Example 7 | 441 | 45 | 30 | 0.17 |
| Example 8 | 392 | 40 | 20 | 0.70 |
| Example 9 | 735 | 75 | 20 | 0.27 |
| Example 10 | 588 | 60 | 30 | 0.30 |
| Example 11 | 294 | 30 | 30 | 2.60 |
| Example 12 | 441 | 45 | 20 | 0.10 |
| Example 13 | 441 | 45 | 20 | 0.26 |
| Example 14 | 588 | 60 | 30 | 0.77 |
| Example 15 | 588 | 60 | 30 | 0.71 |
| Example 16 | 588 | 60 | 30 | 0.13 |
| Example 17 | 588 | 60 | 30 | 0.13 |
| Comparative Example 1 | — | — | — | — |
| Comparative Example 2 | 588 | 60 | 30 | 0.13 |

| | Production of color agent for road making material Adhesion step with organic pigments | | | |
|---|---|---|---|---|
| | Organic pigments | | | |
| Examples and Comparative Examples | Kind | Amount adhered (wt. part) | Kind | Amount adhered (wt. part) |
| Example 2 | Y-1 | 60.0 | R-2 | 1.0 |
| Example 3 | Y-1 | 40.0 | R-1 | 1.0 |
| Example 4 | Y-2 | 20.0 | R-1 | 0.6 |
| Example 5 | Y-1 | 150.0 | — | — |
| Example 6 | Y-1 | 30.0 | R-2 | 1.0 |

TABLE 5-continued

| | | | | |
|---|---|---|---|---|
| Example 7 | R-1 | 100.0 | — | — |
| Example 8 | B-1 | 20.0 | — | — |
| Example 9 | Y-1 | 30.0 | R-1 | 2.0 |
| Example 10 | Y-1 | 60.0 | R-2 | 1.5 |
| Example 11 | Y-2 | 30.0 | R-1 | 0.5 |
| Example 12 | Y-2 | 40.0 | R-1 | 1.5 |
| Example 13 | R-2 | 80.0 | — | — |
| Example 14 | Y-2 | 60.0 | R-2 | 1.0 |
| Example 15 | Y-1 | 20.0 | R-1 | 1.0 |
| Example 16 | Y-2 | 72.6 | R-1 | 2.7 |
| Example 17 | Y-2 | 30.0 | R-1 | 0.5 |
| Comparative Example 1 | Y-1 | 60.0 | R-2 | 1.0 |
| Comparative Example 2 | Y-1 | 750.0 | — | — |

Production of color agent for road making material
Adhesion step with organic pigments

| Examples and Comparative Examples | Edge runner treatment | | Amount adhered (calculated as C) (wt. %) |
|---|---|---|---|
| | Linear load (N/cm) | Time (Kg/cm) (min.) | |
| Example 2 | 588 | 60 | 60 | 21.37 |
| Example 3 | 588 | 60 | 60 | 16.43 |
| Example 4 | 588 | 60 | 60 | 9.15 |
| Example 5 | 735 | 75 | 60 | 34.04 |
| Example 6 | 588 | 60 | 60 | 19.22 |
| Example 7 | 735 | 75 | 30 | 30.16 |
| Example 8 | 294 | 30 | 30 | 11.08 |
| Example 9 | 735 | 75 | 20 | 13.75 |
| Example 10 | 735 | 75 | 60 | 21.52 |
| Example 11 | 588 | 60 | 60 | 12.29 |
| Example 12 | 588 | 60 | 90 | 15.66 |
| Example 13 | 441 | 45 | 20 | 22.34 |
| Example 14 | 588 | 60 | 60 | 20.11 |
| Example 15 | 441 | 45 | 30 | 9.92 |
| Example 16 | 588 | 60 | 60 | 22.34 |
| Example 17 | 588 | 60 | 60 | 12.03 |
| Comparative Example 1 | 588 | 60 | 60 | 21.31 |
| Comparative Example 2 | 588 | 60 | 60 | 50.15 |

TABLE 6

Properties of color agent for road making material

| Examples and Comparative Examples | Average particle diameter (μm) | BET specific surface area value (m²/g) | Lightness (L* value) (—) |
|---|---|---|---|
| Example 2 | 0.256 | 17.2 | 66.40 |
| Example 3 | 0.055 | 58.3 | 70.25 |
| Example 4 | 0.184 | 19.6 | 71.38 |
| Example 5 | 0.146 | 24.8 | 68.04 |
| Example 6 | 0.502 | 13.9 | 65.78 |
| Example 7 | 0.607 | 11.9 | 40.33 |
| Example 8 | 0.405 | 22.5 | 28.62 |
| Example 9 | 0.255 | 17.6 | 66.23 |
| Example 10 | 0.057 | 61.3 | 68.29 |
| Example 11 | 0.186 | 21.6 | 69.55 |
| Example 12 | 0.142 | 19.7 | 65.32 |
| Example 13 | 0.505 | 16.4 | 41.11 |
| Example 14 | 0.613 | 8.1 | 67.47 |
| Example 15 | 0.404 | 20.4 | 57.76 |
| Example 16 | 0.296 | 19.3 | 63.27 |
| Example 17 | 0.379 | 15.1 | 68.33 |
| Comparative Example 1 | 0.253 | 20.9 | 62.13 |
| Comparative Example 2 | 0.268 | 26.4 | 67.98 |
| Comparative Example 3 | 0.259 | 18.9 | 69.64 |
| Comparative Example 4 | 0.295 | 24.2 | 61.50 |

Properties of color agent for road making material

| Examples and Comparative Examples | Tinting strength (%) | Hiding power (cm²/g) | Surface activity (%) |
|---|---|---|---|
| Example 2 | 138 | 1,420 | 1.13 |
| Example 3 | 126 | 622 | 1.26 |
| Example 4 | 121 | 814 | 1.45 |
| Example 5 | 144 | 443 | 1.04 |
| Example 6 | 133 | 425 | 1.09 |
| Example 7 | 130 | 682 | 1.09 |
| Example 8 | 126 | 1,820 | 1.49 |
| Example 9 | 130 | 1,440 | 0.91 |
| Example 10 | 153 | 644 | 0.83 |
| Example 11 | 133 | 831 | 0.90 |
| Example 12 | 142 | 414 | 0.88 |
| Example 13 | 131 | 472 | 0.85 |
| Example 14 | 155 | 649 | 0.84 |
| Example 15 | 136 | 1,780 | 1.03 |
| Example 16 | 131 | 688 | 1.10 |
| Example 17 | 142 | 658 | 0.97 |
| Comparative Example 1 | 100 | 1,304 | 2.46 |
| Comparative Example 2 | 195 | 1,211 | 2.32 |
| Comparative Example 3 | 98 | 1,290 | 2.06 |
| Comparative Example 4 | 108 | 569 | 2.04 |

Properties of color agent for road making material

| Examples and Comparative Examples | Heat resistance (° C.) | Light resistance (ΔE* value) (—) | Desorption percentage of organic pigments (%) |
|---|---|---|---|
| Example 2 | 232 | 2.65 | 8.6 |
| Example 3 | 241 | 2.43 | 7.3 |
| Example 4 | 253 | 2.17 | 6.8 |
| Example 5 | 228 | 2.85 | 9.2 |
| Example 6 | 229 | 2.59 | 7.4 |
| Example 7 | 230 | 2.69 | 9.0 |
| Example 8 | 266 | 2.80 | 8.6 |
| Example 9 | 252 | 2.11 | 4.1 |
| Example 10 | 248 | 2.24 | 4.6 |
| Example 11 | 257 | 2.01 | 3.2 |
| Example 12 | 246 | 1.95 | 4.5 |
| Example 13 | 253 | 2.13 | 4.4 |
| Example 14 | 250 | 2.00 | 4.5 |
| Example 15 | 269 | 2.48 | 4.6 |
| Example 16 | 234 | 2.72 | 8.9 |
| Example 17 | 251 | 2.26 | 4.9 |
| Comparative Example 1 | 183 | 6.95 | 63.8 |
| Comparative Example 2 | 180 | 6.74 | 36.5 |
| Comparative Example 3 | 188 | 5.66 | 34.2 |
| Comparative Example 4 | 207 | 5.15 | 26.5 |

TABLE 7

Production of intermediate particles
Coating step with gluing agent

| Intermediate particles | Kind of core particles | Additives Kind | Amount added (wt. part) |
|---|---|---|---|
| Intermediate particles 1 | Core particles 1 | Methylhydrogen-polysiloxane | 2.0 |
| Intermediate particles 2 | Core particles 3 | Methyl-triethoxysilane | 1.0 |
| Intermediate particles 3 | Core particles 5 | Polyvinyl alcohol | 2.0 |
| Intermediate particles 4 | Core particles 6 | γ-aminopropyl-triethoxysilane | 2.0 |
| Intermediate particles 5 | Core particles 11 | Isopropyltriiso-stearoyl titanate | 3.0 |
| Intermediate particles 6 | Core particles 14 | Phenyl-triethoxysilane | 1.5 |
| Intermediate particles 7 | Core particles 1 and 5 | Methylhydrogen-polysiloxane | 1.5 |

Production of intermediate particles
Coating step with gluing agent

| Intermediate particles | Edge runner treatment Linear load (N/cm) | Linear load (Kg/cm) | Time (min.) | Coating amount Calculated as C (wt. %) |
|---|---|---|---|---|
| Intermediate particles 1 | 588 | 60 | 20 | 0.53 |
| Intermediate particles 2 | 294 | 30 | 30 | 0.07 |
| Intermediate particles 3 | 441 | 45 | 30 | 1.06 |
| Intermediate particles 4 | 392 | 40 | 20 | 0.32 |
| Intermediate particles 5 | 588 | 60 | 30 | 2.19 |
| Intermediate particles 6 | 441 | 45 | 20 | 0.54 |
| Intermediate particles 7 | 588 | 60 | 30 | 0.40 |

Production of intermediate particles
Adhesion step with organic pigments
Organic pigments

| Intermediate particles | Kind | Amount adhered (wt. part) |
|---|---|---|
| Intermediate particles 1 | Y-1 | 80.0 |
| Intermediate particles 2 | R-2 | 50.0 |
| Intermediate particles 3 | Y-2 | 75.0 |
| Intermediate particles 4 | Y-2 | 45.0 |
| Intermediate particles 5 | B-1 | 100.0 |
| Intermediate particles 6 | Y-1 | 20.0 |
| Intermediate particles 7 | Y-2 | 30.0 |

TABLE 7-continued

Production of intermediate particles
Adhesion step with organic pigments

| Intermediate particles | Edge runner treatment Linear load (N/cm) | Linear load (Kg/cm) | Time (min.) | Amount adhered (calculated as C) (wt. %) |
|---|---|---|---|---|
| Intermediate particles 1 | 588 | 60 | 30 | 23.59 |
| Intermediate particles 2 | 588 | 60 | 30 | 16.77 |
| Intermediate particles 3 | 588 | 60 | 20 | 22.45 |
| Intermediate particles 4 | 588 | 60 | 20 | 16.46 |
| Intermediate particles 5 | 735 | 75 | 60 | 33.25 |
| Intermediate particles 6 | 294 | 30 | 20 | 9.43 |
| Intermediate particles 7 | 294 | 30 | 30 | 11.95 |

TABLE 8

Production of color agent for road marking material
Coating step with gluing agent

| Examples | Kind of intermediate particles | Additives Kind | Amount added (wt. part) |
|---|---|---|---|
| Example 18 | Intermediate particles 1 | Dimethyl-polysiloxane | 3.0 |
| Example 19 | Intermediate particles 2 | Methylhydrogen-polysiloxane | 2.0 |
| Example 20 | Intermediate particles 3 | Methyl-triethoxysilane | 2.0 |
| Example 21 | Intermediate particles 4 | γ-aminopropyl-triethoxysilane | 1.5 |
| Example 22 | Intermediate particles 5 | Dimethyl-polysiloxane | 1.0 |
| Example 23 | Intermediate particles 6 | Methyl-triethoxysilane | 2.0 |
| Example 24 | Intermediate particles 7 | Dimethyl-polysiloxane | 1.5 |

Production of color agent for road marking material
Coating step with gluing agent

| Examples | Edge runner treatment Linear load (N/cm) | Linear load (Kg/cm) | Time (min.) | Coating amount Calculated as C (wt. %) |
|---|---|---|---|---|
| Example 18 | 588 | 60 | 30 | 0.95 |
| Example 19 | 441 | 45 | 20 | 0.53 |
| Example 20 | 294 | 30 | 20 | 0.13 |
| Example 21 | 294 | 30 | 20 | 0.24 |
| Example 22 | 294 | 30 | 20 | 0.32 |
| Example 23 | 588 | 60 | 30 | 0.13 |
| Example 24 | 588 | 60 | 30 | 0.48 |

TABLE 8-continued

Production of color agent for road marking material
Adhesion step with organic pigments
Organic pigments

| Examples | Kind | Amount adhered (wt. part) |
|---|---|---|
| Example 18 | R-1 | 1.5 |
| Example 19 | R-1 | 50.0 |
| Example 20 | Y-2 | 75.0 |
| Example 21 | R-2 | 1.0 |
| Example 22 | B-1 | 50.0 |
| Example 23 | B-1 | 10.0 |
| Example 24 | R-1 | 0.5 |

Production of color agent for road marking material
Adhesion step with organic pigments

| | Edge runner treatment | | Amount adhered (calculated as C) |
|---|---|---|---|
| | Linear load | Time | |
| Examples | (N/cm) | (Kg/cm) | (min.) | (wt. %) |
| Example 18 | 294 | 30 | 20 | 0.86 |
| Example 19 | 588 | 60 | 60 | 20.04 |
| Example 20 | 588 | 60 | 20 | 22.39 |
| Example 21 | 294 | 30 | 20 | 0.48 |
| Example 22 | 588 | 60 | 30 | 22.17 |
| Example 23 | 441 | 45 | 30 | 6.10 |
| Example 24 | 294 | 30 | 20 | 0.28 |

TABLE 9

Properties of color agent for road making material

| Examples | Average particle diameter (μm) | BET specific surface area value (m²/g) | Lightness (L* value) (—) |
|---|---|---|---|
| Example 18 | 0.256 | 16.8 | 68.55 |
| Example 19 | 0.187 | 25.8 | 46.58 |
| Example 20 | 0.507 | 21.4 | 64.37 |
| Example 21 | 0.605 | 6.9 | 67.29 |
| Example 22 | 0.146 | 24.1 | 20.54 |
| Example 23 | 0.403 | 23.5 | 38.90 |
| Example 24 | 0.379 | 15.3 | 68.05 |

Properties of color agent for road making material

| Examples | Tinting strength (%) | Hiding power (cm²/g) | Surface activity (%) |
|---|---|---|---|
| Example 18 | 132 | 1,460 | 1.12 |
| Example 19 | 140 | 814 | 1.03 |
| Example 20 | 142 | 515 | 1.03 |
| Example 21 | 130 | 631 | 1.10 |
| Example 22 | 146 | 433 | 0.74 |
| Example 23 | 129 | 1,760 | 1.05 |
| Example 24 | 140 | 651 | 1.13 |

TABLE 9-continued

Properties of color agent for road making material

| Examples | Heat resistance (° C.) | Light resistance (ΔE* value) (—) | Desorption percentage of organic pigments (%) |
|---|---|---|---|
| Example 18 | 233 | 2.66 | 7.1 |
| Example 19 | 228 | 2.71 | 8.1 |
| Example 20 | 231 | 2.48 | 8.3 |
| Example 21 | 230 | 2.40 | 6.4 |
| Example 22 | 259 | 1.87 | 8.4 |
| Example 23 | 270 | 2.75 | 7.5 |
| Example 24 | 244 | 2.64 | 6.9 |

TABLE 10

Production of surface-coated road marking material
Coating step with fatty acid, fatty acid metal salt or coupling agent

| Examples | Kind of composite particles | Additives Kind | Amount added (wt. part) |
|---|---|---|---|
| Example 25 | Example 5 | 2-ethyl hexanoic acid | 5.0 |
| Example 26 | Example 6 | Zinc stearate | 1.5 |
| Example 27 | Example 8 | γ-aminopropyl-triethoxysilane | 1.0 |
| Example 28 | Example 11 | Zinc stearate | 1.0 |
| Example 29 | Example 14 | Magnesium stearate | 1.0 |
| Example 30 | Example 17 | γ-aminopropyl-triethoxysilane | 3.0 |
| Example 31 | Example 18 | Calcium stearate | 1.5 |

Production of surface-coated road marking material
Coating step with fatty acid, fatty acid metal salt or coupling agent

| Examples | Kneading temperature (° C.) | Kneading time (min.) | Coating amount (calculated as C) (wt. %) |
|---|---|---|---|
| Example 25 | 120 | 30 | 3.17 |
| Example 26 | 120 | 30 | 1.00 |
| Example 27 | 120 | 30 | 0.16 |
| Example 28 | 80 | 30 | 0.67 |
| Example 29 | 120 | 30 | 0.72 |
| Example 30 | 80 | 30 | 0.59 |
| Example 31 | 60 | 30 | 1.05 |

TABLE 11

Properties of surface-coated color agent for road making material

| Examples | Average particle diameter (μm) | BET specific surface area value (m²/g) | Lightness (L* value) (—) |
|---|---|---|---|
| Example 25 | 0.147 | 23.6 | 68.37 |
| Example 26 | 0.503 | 13.5 | 65.92 |
| Example 27 | 0.406 | 21.3 | 28.85 |
| Example 28 | 0.187 | 20.5 | 69.81 |

TABLE 11-continued

| Examples | | | |
|---|---|---|---|
| Example 29 | 0.615 | 7.8 | 67.62 |
| Example 30 | 0.380 | 14.7 | 68.59 |
| Example 31 | 0.257 | 16.0 | 68.70 |

Properties of surface-coated color agent for road making material

| Examples | Tinting strength (%) | Hiding power (cm²/g) | Surface activity (%) |
|---|---|---|---|
| Example 25 | 146 | 440 | 0.99 |
| Example 26 | 134 | 419 | 1.04 |
| Example 27 | 127 | 1,810 | 1.36 |
| Example 28 | 135 | 828 | 0.88 |
| Example 29 | 157 | 642 | 0.81 |
| Example 30 | 143 | 651 | 0.92 |
| Example 31 | 135 | 1,455 | 0.97 |

Properties of surface-coated color agent for road making material

| Examples | Heat resistance (° C.) | Light resistance (ΔE* value) (—) | Desorption percentage of organic pigments (%) |
|---|---|---|---|
| Example 25 | 229 | 2.74 | 4.6 |
| Example 26 | 231 | 2.49 | 3.4 |
| Example 27 | 267 | 2.73 | 4.1 |
| Example 28 | 258 | 1.96 | 2.9 |
| Example 29 | 253 | 1.95 | 3.2 |
| Example 30 | 252 | 2.18 | 2.7 |
| Example 31 | 236 | 2.57 | 5.9 |

TABLE 12

Production of road marking paint (first class)
Color agent for road marking paint

| Examples | Kind | Amount blended (wt. part) | Kind | Amount blended (wt. part) |
|---|---|---|---|---|
| Example 32 | Example 2 | 15.0 | — | — |
| Example 33 | Example 3 | 15.0 | — | — |
| Example 34 | Example 4 | 15.0 | — | — |
| Example 35 | Example 5 | 15.0 | — | — |
| Example 36 | Example 6 | 15.0 | — | — |
| Example 37 | Example 7 | 15.0 | — | — |
| Example 38 | Example 8 | 15.0 | — | — |
| Example 39 | Example 9 | 15.0 | — | — |
| Example 40 | Example 10 | 15.0 | — | — |
| Example 41 | Example 11 | 15.0 | — | — |
| Example 42 | Example 12 | 15.0 | — | — |
| Example 43 | Example 13 | 15.0 | — | — |
| Example 44 | Example 14 | 15.0 | — | — |
| Example 45 | Example 15 | 15.0 | — | — |
| Example 46 | Example 16 | 15.0 | — | — |
| Example 47 | Example 17 | 15.0 | — | — |
| Example 48 | Example 18 | 15.0 | — | — |
| Example 49 | Example 19 | 15.0 | — | — |
| Example 50 | Example 20 | 15.0 | — | — |
| Example 51 | Example 21 | 15.0 | — | — |
| Example 52 | Example 22 | 15.0 | — | — |
| Example 53 | Example 23 | 15.0 | — | — |
| Example 54 | Example 24 | 15.0 | — | — |
| Example 55 | Example 25 | 15.0 | — | — |
| Example 56 | Example 26 | 15.0 | — | — |
| Example 57 | Example 27 | 15.0 | — | — |
| Example 58 | Example 28 | 15.0 | — | — |
| Example 59 | Example 29 | 15.0 | — | — |
| Example 60 | Example 30 | 15.0 | — | — |
| Example 61 | Example 31 | 15.0 | — | — |
| Example 62 | Example 2 | 7.5 | Example 6 | 7.5 |

TABLE 13

Production of road marking paint (first class)
Color agent for road marking paint

| Comparative Examples | Kind | Amount blended (wt. part) | Kind | Amount blended (wt. part) |
|---|---|---|---|---|
| Comparative Example 5 | Organic pigments Y-1 | 14.5 | Organic pigments R-2 | 0.5 |
| Comparative Example 6 | Organic pigments R-2 | 15.0 | — | — |
| Comparative Example 7 | Comparative Example 1 | 15.0 | — | — |
| Comparative Example 8 | Comparative Example 2 | 15.0 | — | — |
| Comparative Example 9 | Comparative Example 3 | 15.0 | — | — |
| Comparative Example 10 | Comparative Example 4 | 15.0 | — | — |

TABLE 14

Properties of road marking paint (first class)

| Examples | Contrast ratio (—) | Alkali resistance (—) | Abrasion resistance (mg) |
|---|---|---|---|
| Example 32 | 0.96 | 4 | 313 |
| Example 33 | 0.86 | 5 | 334 |
| Example 34 | 0.91 | 5 | 308 |
| Example 35 | 0.83 | 5 | 322 |
| Example 36 | 0.84 | 5 | 325 |
| Example 37 | 0.85 | 5 | 328 |
| Example 38 | 0.96 | 5 | 340 |
| Example 39 | 0.97 | 5 | 271 |
| Example 40 | 0.87 | 4 | 287 |
| Example 41 | 0.91 | 5 | 279 |
| Example 42 | 0.82 | 5 | 262 |
| Example 43 | 0.85 | 5 | 277 |
| Example 44 | 0.84 | 4 | 298 |
| Example 45 | 0.97 | 5 | 295 |
| Example 46 | 0.90 | 4 | 320 |
| Example 47 | 0.92 | 5 | 298 |
| Example 48 | 0.97 | 5 | 315 |
| Example 49 | 0.92 | 4 | 324 |
| Example 50 | 0.84 | 5 | 318 |
| Example 51 | 0.83 | 4 | 309 |
| Example 52 | 0.82 | 5 | 263 |
| Example 53 | 0.96 | 5 | 277 |
| Example 54 | 0.92 | 5 | 320 |
| Example 55 | 0.84 | 5 | 248 |
| Example 56 | 0.85 | 5 | 242 |
| Example 57 | 0.96 | 5 | 239 |
| Example 58 | 0.92 | 5 | 229 |

TABLE 14-continued

| | | | |
|---|---|---|---|
| Example 59 | 0.87 | 4 | 210 |
| Example 60 | 0.92 | 5 | 243 |
| Example 61 | 0.97 | 5 | 199 |
| Example 62 | 0.91 | 4 | 330 |

| | Properties of road marking paint (first class) | | |
|---|---|---|---|
| Examples | Light resistance (ΔE* value) (—) | Aging resistance (ΔE* value) (—) | Retro-reflective property (—) |
| Example 32 | 3.41 | 1.92 | 4 |
| Example 33 | 3.20 | 1.95 | 3 |
| Example 34 | 2.95 | 1.91 | 4 |
| Example 35 | 3.62 | 1.88 | 3 |
| Example 36 | 3.48 | 1.90 | 3 |
| Example 37 | 3.43 | 1.85 | — |
| Example 38 | 3.51 | 2.17 | — |
| Example 39 | 2.88 | 1.56 | 4 |
| Example 40 | 2.98 | 1.59 | 3 |
| Example 41 | 2.76 | 1.50 | 4 |
| Example 42 | 2.69 | 1.41 | 3 |
| Example 43 | 2.92 | 1.44 | — |
| Example 44 | 2.75 | 1.38 | 3 |
| Example 45 | 3.22 | 1.77 | 3 |
| Example 46 | 3.44 | 1.91 | 3 |
| Example 47 | 3.13 | 1.63 | 4 |
| Example 48 | 3.39 | 1.90 | 4 |
| Example 49 | 3.40 | 1.89 | — |
| Example 50 | 3.42 | 1.88 | 3 |
| Example 51 | 3.18 | 1.71 | 3 |
| Example 52 | 2.65 | 1.33 | — |
| Example 53 | 3.27 | 1.94 | — |
| Example 54 | 3.31 | 1.62 | 4 |
| Example 55 | 3.49 | 1.85 | 3 |
| Example 56 | 3.41 | 1.87 | 3 |
| Example 57 | 3.47 | 2.14 | — |
| Example 58 | 2.68 | 1.44 | 4 |
| Example 59 | 2.65 | 1.40 | 3 |
| Example 60 | 3.39 | 1.60 | 4 |
| Example 61 | 3.26 | 1.79 | 4 |
| Example 62 | 3.50 | 1.93 | 4 |

TABLE 15

| | Properties of road marking paint (first class) | | |
|---|---|---|---|
| Comparative Examples | Contrast ratio (—) | Alkali resistance (—) | Abrasion resistance (mg) |
| Comparative Example 5 | 0.76 | 2 | 511 |
| Comparative Example 6 | 0.69 | 1 | 484 |
| Comparative Example 7 | 0.74 | 2 | 572 |
| Comparative Example 8 | 0.77 | 3 | 549 |
| Comparative Example 9 | 0.73 | 3 | 533 |
| Comparative Example 10 | 0.82 | 2 | 438 |

| | Properties of road marking paint (first class) | | |
|---|---|---|---|
| Comparative Examples | Light resistance (ΔE* value) (—) | Aging resistance (ΔE* value) (—) | Retro-reflective property (—) |
| Comparative Example 5 | 18.26 | 3.58 | 1 |
| Comparative Example 6 | 18.84 | 3.46 | — |
| Comparative Example 7 | 7.81 | 4.77 | 2 |
| Comparative Example 8 | 7.65 | 4.60 | 1 |
| Comparative Example 9 | 6.52 | 3.92 | 2 |
| Comparative Example 10 | 5.07 | 2.71 | 2 |

TABLE 16

| | Production of road marking paint (second class) Color agent for road marking paint | | | |
|---|---|---|---|---|
| Examples | Kind | Amount blended (wt. part) | Kind | Amount blended (wt. part) |
| Example 63 | Example 2 | 15.0 | — | — |
| Example 64 | Example 3 | 15.0 | — | — |
| Example 65 | Example 4 | 15.0 | — | — |
| Example 66 | Example 5 | 15.0 | — | — |
| Example 67 | Example 6 | 15.0 | — | — |
| Example 68 | Example 7 | 15.0 | — | — |
| Example 69 | Example 8 | 15.0 | — | — |
| Example 70 | Example 9 | 15.0 | — | — |
| Example 71 | Example 10 | 15.0 | — | — |
| Example 72 | Example 11 | 15.0 | — | — |
| Example 73 | Example 12 | 15.0 | — | — |
| Example 74 | Example 13 | 15.0 | — | — |
| Example 75 | Example 14 | 15.0 | — | — |
| Example 76 | Example 15 | 15.0 | — | — |
| Example 77 | Example 16 | 15.0 | — | — |
| Example 78 | Example 17 | 15.0 | — | — |
| Example 79 | Example 18 | 15.0 | — | — |
| Example 80 | Example 19 | 15.0 | — | — |
| Example 81 | Example 20 | 15.0 | — | — |
| Example 82 | Example 21 | 15.0 | — | — |
| Example 83 | Example 22 | 15.0 | — | — |
| Example 84 | Example 23 | 15.0 | — | — |
| Example 85 | Example 24 | 15.0 | — | — |
| Example 86 | Example 25 | 15.0 | — | — |
| Example 87 | Example 26 | 15.0 | — | — |
| Example 88 | Example 27 | 15.0 | — | — |
| Example 89 | Example 28 | 15.0 | — | — |
| Example 90 | Example 29 | 15.0 | — | — |
| Example 91 | Example 30 | 15.0 | — | — |
| Example 92 | Example 31 | 15.0 | — | — |
| Example 93 | Example 2 | 7.5 | Example 6 | 7.5 |

TABLE 17

| | Production of road marking paint (second class) Color agent for road marking paint | | | |
|---|---|---|---|---|
| Comparative Examples | Kind | Amount blended (wt. part) | Kind | Amount blended (wt. part) |
| Comparative Example 11 | Organic pigments Y-1 | 14.5 | Organic pigments R-1 | 0.5 |
| Comparative Example 12 | Organic pigments B-1 | 15.0 | — | — |
| Comparative Example 13 | Comparative Example 1 | 15.0 | — | — |

TABLE 17-continued

Production of road marking paint (second class)
Color agent for road marking paint

| Comparative Examples | Kind | Amount blended (wt. part) | Kind | Amount blended (wt. part) |
|---|---|---|---|---|
| Comparative Example 14 | Comparative Example 2 | 15.0 | — | — |
| Comparative Example 15 | Comparative Example 3 | 15.0 | — | — |
| Comparative Example 16 | Comparative Example 4 | 15.0 | — | — |

TABLE 18

Properties of road marking paint (second class)

| Examples | Contrast ratio (—) | Alkali resistance (—) | Abrasion resistance (mg) |
|---|---|---|---|
| Example 63 | 0.97 | 4 | 275 |
| Example 64 | 0.86 | 5 | 297 |
| Example 65 | 0.92 | 5 | 268 |
| Example 66 | 0.84 | 5 | 281 |
| Example 67 | 0.85 | 5 | 284 |
| Example 68 | 0.85 | 5 | 288 |
| Example 69 | 0.97 | 5 | 294 |
| Example 70 | 0.98 | 5 | 233 |
| Example 71 | 0.88 | 4 | 238 |
| Example 72 | 0.91 | 5 | 237 |
| Example 73 | 0.83 | 5 | 228 |
| Example 74 | 0.85 | 5 | 236 |
| Example 75 | 0.85 | 4 | 247 |
| Example 76 | 0.98 | 5 | 240 |
| Example 77 | 0.91 | 4 | 280 |
| Example 78 | 0.93 | 5 | 261 |
| Example 79 | 0.98 | 5 | 280 |
| Example 80 | 0.92 | 4 | 295 |
| Example 81 | 0.85 | 5 | 287 |
| Example 82 | 0.83 | 4 | 298 |
| Example 83 | 0.83 | 5 | 233 |
| Example 84 | 0.97 | 5 | 241 |
| Example 85 | 0.92 | 5 | 294 |
| Example 86 | 0.84 | 5 | 197 |
| Example 87 | 0.86 | 5 | 197 |
| Example 88 | 0.97 | 5 | 195 |
| Example 89 | 0.92 | 5 | 190 |
| Example 90 | 0.88 | 4 | 188 |
| Example 91 | 0.93 | 5 | 210 |
| Example 92 | 0.98 | 5 | 172 |
| Example 93 | 0.92 | 4 | 316 |

Properties of road marking paint (second class)

| Examples | Light resistance (ΔE* value) (—) | Aging resistance (ΔE* value) (—) | Retro-reflective property (—) |
|---|---|---|---|
| Example 63 | 3.36 | 1.90 | 4 |
| Example 64 | 3.15 | 1.94 | 4 |
| Example 65 | 2.91 | 1.89 | 4 |
| Example 66 | 3.58 | 1.85 | 3 |
| Example 67 | 3.44 | 1.89 | 3 |
| Example 68 | 3.40 | 1.82 | — |
| Example 69 | 3.47 | 2.14 | — |
| Example 70 | 2.83 | 1.54 | 4 |
| Example 71 | 2.96 | 1.56 | 4 |
| Example 72 | 2.75 | 1.47 | 4 |
| Example 73 | 2.65 | 1.38 | 4 |
| Example 74 | 2.88 | 1.41 | — |
| Example 75 | 2.72 | 1.35 | 3 |
| Example 76 | 3.20 | 1.75 | 3 |
| Example 77 | 3.41 | 1.88 | 3 |
| Example 78 | 3.09 | 1.60 | 4 |
| Example 79 | 3.34 | 1.88 | 4 |
| Example 80 | 3.36 | 1.86 | — |
| Example 81 | 3.37 | 1.85 | 3 |
| Example 82 | 3.15 | 1.69 | 4 |
| Example 83 | 3.60 | 1.30 | — |
| Example 84 | 3.41 | 1.91 | — |
| Example 85 | 3.27 | 1.60 | 4 |
| Example 86 | 3.45 | 1.84 | 4 |
| Example 87 | 3.38 | 1.86 | 3 |
| Example 88 | 3.42 | 2.13 | — |
| Example 89 | 2.62 | 1.41 | 4 |
| Example 90 | 2.60 | 1.39 | 4 |
| Example 91 | 3.35 | 1.59 | 4 |
| Example 92 | 3.20 | 1.77 | 4 |
| Example 93 | 3.45 | 1.92 | 4 |

TABLE 19

Properties of road marking paint (second class)

| Comparative Examples | Contrast ratio (—) | Alkali resistance (—) | Abrasion resistance (mg) |
|---|---|---|---|
| Comparative Example 11 | 0.76 | 2 | 492 |
| Comparative Example 12 | 0.70 | 1 | 455 |
| Comparative Example 13 | 0.75 | 2 | 520 |
| Comparative Example 14 | 0.74 | 3 | 503 |
| Comparative Example 15 | 0.73 | 3 | 501 |
| Comparative Example 16 | 0.83 | 2 | 416 |

Properties of road marking paint (second class)

| Comparative Examples | Light resistance (ΔE* value) (—) | Aging resistance (ΔE* value) (—) | Retro-reflective property (—) |
|---|---|---|---|
| Comparative Example 11 | 18.22 | 3.55 | 1 |
| Comparative Example 12 | 18.69 | 3.44 | — |
| Comparative Example 13 | 7.79 | 4.74 | 2 |
| Comparative Example 14 | 7.61 | 4.58 | 1 |
| Comparative Example 15 | 6.48 | 3.90 | 2 |
| Comparative Example 16 | 5.04 | 2.68 | 2 |

TABLE 20

Production of road marking paint (third class)
Color agent for road marking paint

| Examples | Kind | Amount blended (wt. part) | Kind | Amount blended (wt. part) |
|---|---|---|---|---|
| Example 94 | Example 2 | 5.0 | — | — |
| Example 95 | Example 3 | 5.0 | — | — |
| Example 96 | Example 4 | 5.0 | — | — |
| Example 97 | Example 5 | 5.0 | — | — |
| Example 98 | Example 6 | 5.0 | — | — |
| Example 99 | Example 7 | 5.0 | — | — |
| Example 100 | Example 8 | 5.0 | — | — |
| Example 101 | Example 9 | 5.0 | — | — |
| Example 102 | Example 10 | 5.0 | — | — |
| Example 103 | Example 11 | 5.0 | — | — |
| Example 104 | Example 12 | 5.0 | — | — |
| Example 105 | Example 13 | 5.0 | — | — |
| Example 106 | Example 14 | 5.0 | — | — |
| Example 107 | Example 15 | 5.0 | — | — |
| Example 108 | Example 16 | 5.0 | — | — |
| Example 109 | Example 17 | 5.0 | — | — |
| Example 110 | Example 18 | 5.0 | — | — |
| Example 111 | Example 19 | 5.0 | — | — |
| Example 112 | Example 20 | 5.0 | — | — |
| Example 113 | Example 21 | 5.0 | — | — |
| Example 114 | Example 22 | 5.0 | — | — |
| Example 115 | Example 23 | 5.0 | — | — |
| Example 116 | Example 24 | 5.0 | — | — |
| Example 117 | Example 25 | 5.0 | — | — |
| Example 118 | Example 26 | 5.0 | — | — |
| Example 119 | Example 27 | 5.0 | — | — |
| Example 120 | Example 28 | 5.0 | — | — |
| Example 121 | Example 29 | 5.0 | — | — |
| Example 122 | Example 30 | 5.0 | — | — |
| Example 123 | Example 31 | 5.0 | — | — |
| Example 124 | Example 2 | 2.5 | Example 6 | 2.5 |

TABLE 21

Production of road marking paint (third class)
Color agent for road marking paint

| Comparative Examples | Kind | Amount blended (wt. part) | Kind | Amount blended (wt. part) |
|---|---|---|---|---|
| Comparative Example 17 | Organic pigments Y-1 | 4.9 | Organic pigments R-1 | 0.1 |
| Comparative Example 18 | Organic pigments B-1 | 5.0 | — | — |
| Comparative Example 19 | Comparative Example 1 | 5.0 | — | — |
| Comparative Example 20 | Comparative Example 2 | 5.0 | — | — |
| Comparative Example 21 | Comparative Example 3 | 5.0 | — | — |
| Comparative Example 22 | Comparative Example 4 | 5.0 | — | — |

TABLE 22

Properties of road marking paint (third class)

| Examples | Alkali resistance (—) | Abrasion resistance (mg) |
|---|---|---|
| Example 94 | 4 | 147 |
| Example 95 | 5 | 165 |
| Example 96 | 5 | 143 |
| Example 97 | 5 | 150 |
| Example 98 | 5 | 156 |
| Example 99 | 5 | 154 |
| Example 100 | 5 | 161 |
| Example 101 | 5 | 105 |
| Example 102 | 4 | 118 |
| Example 103 | 5 | 113 |
| Example 104 | 5 | 99 |
| Example 105 | 5 | 110 |
| Example 106 | 4 | 128 |
| Example 107 | 5 | 114 |
| Example 108 | 4 | 156 |
| Example 109 | 5 | 143 |
| Example 110 | 5 | 139 |
| Example 111 | 4 | 144 |
| Example 112 | 5 | 141 |
| Example 113 | 4 | 150 |
| Example 114 | 5 | 106 |
| Example 115 | 5 | 114 |
| Example 116 | 5 | 148 |
| Example 117 | 5 | 88 |
| Example 118 | 5 | 92 |
| Example 119 | 5 | 85 |
| Example 120 | 5 | 85 |
| Example 121 | 4 | 79 |
| Example 122 | 5 | 96 |
| Example 123 | 5 | 72 |
| Example 124 | 4 | 189 |

Properties of road marking paint (third class)

| Examples | Light resistance ($\Delta E^*$ value) (—) | Aging resistance ($\Delta E^*$ value) (—) | Retro-reflective property (—) |
|---|---|---|---|
| Example 94 | 3.21 | 1.89 | 4 |
| Example 95 | 3.02 | 1.91 | 4 |
| Example 96 | 2.78 | 1.84 | 4 |
| Example 97 | 3.45 | 1.83 | 4 |
| Example 98 | 3.29 | 1.86 | 3 |
| Example 99 | 3.26 | 1.80 | — |
| Example 100 | 3.34 | 2.10 | — |
| Example 101 | 2.68 | 1.51 | 4 |
| Example 102 | 2.79 | 1.55 | 4 |
| Example 103 | 2.61 | 1.45 | 4 |
| Example 104 | 2.50 | 1.34 | 4 |
| Example 105 | 2.72 | 1.39 | — |
| Example 106 | 2.58 | 1.33 | 4 |
| Example 107 | 3.07 | 1.71 | 3 |
| Example 108 | 3.26 | 1.86 | 3 |
| Example 109 | 2.95 | 1.57 | 4 |
| Example 110 | 3.21 | 1.85 | 4 |
| Example 111 | 3.22 | 1.81 | — |
| Example 112 | 3.14 | 1.82 | 3 |
| Example 113 | 2.99 | 1.66 | 4 |
| Example 114 | 2.48 | 1.27 | — |
| Example 115 | 3.29 | 1.92 | — |
| Example 116 | 3.11 | 1.55 | 4 |
| Example 117 | 3.26 | 1.82 | 4 |
| Example 118 | 3.22 | 1.84 | 3 |
| Example 119 | 3.37 | 2.10 | — |
| Example 120 | 2.50 | 1.37 | 4 |
| Example 121 | 2.43 | 1.35 | 4 |
| Example 122 | 3.20 | 1.55 | 4 |
| Example 123 | 3.17 | 1.74 | 4 |
| Example 124 | 3.33 | 1.90 | 4 |

TABLE 23

| Comparative Examples | Properties of road marking paint (third class) | |
|---|---|---|
| | Alkali resistance (—) | Abrasion resistance (mg) |
| Comparative Example 17 | 2 | 221 |
| Comparative Example 18 | 1 | 214 |
| Comparative Example 19 | 2 | 245 |
| Comparative Example 20 | 3 | 234 |
| Comparative Example 21 | 3 | 226 |
| Comparative Example 22 | 2 | 196 |

| Comparative Examples | Properties of road marking paint (third class) | | |
|---|---|---|---|
| | Light resistance ($\Delta E^*$ value) (—) | Aging resistance ($\Delta E^*$ value) (—) | Retro-reflective property (—) |
| Comparative Example 17 | 18.06 | 3.52 | 1 |
| Comparative Example 18 | 18.65 | 3.41 | — |
| Comparative Example 19 | 7.64 | 4.71 | 2 |
| Comparative Example 20 | 7.87 | 4.55 | 1 |
| Comparative Example 21 | 6.36 | 3.92 | 2 |
| Comparative Example 22 | 5.02 | 2.66 | 2 |

What is claimed is:

1. A road marking material comprising a binder resin, and a color agent comprising composite particles having an average particle diameter of 0.01 to 10.0 μm, said composite particles comprising:
   inorganic particles;
   a gluing agent coating layer formed on surface of said inorganic particle; and
   an organic pigment coat formed onto said gluing agent coating layer in an amount of from 1 to 500 parts by weight based on 100 parts by weight of said inorganic particles, and a filler, said color agent being contained in an amount of 0.1 to 60% by weight based on the weight of the road marking material, wherein said road marking material has an abrasion resistance of not more than 400 mg, a light resistance ($\Delta E^*$ value) of not more than 5.0 and an aging resistance ($\Delta E^*$ value) of not more than 2.5.

2. A road marking material according to claim 1, wherein said filler is at least one material selected from the group consisting of calcium carbonate, talc, silica powder and glass beads.

3. A road marking material according to claim 1, further comprising at least one material selected from the group consisting of a reflecting material, a plasticizer, a solvent, a defoamer, a surfactant and an assistant.

4. In a method of forming a road marking material comprising a binder resin, a color agent and a filler, the improvement comprising using as said color agent, composite particles having an average particle diameter of 0.01 to 10.0 μm, said composite particles comprising:
   inorganic particles;
   a gluing agent coating layer formed on surface of said inorganic particle; and
   an organic pigment coat formed onto said gluing agent coating layer in an amount of from 1 to 500 parts by weight based on 100 parts by weight of said inorganic particles.

5. A road marking material comprising a binder resin, the color agent comprising composite particles having an average particle diameter of 0.01 to 10.0 μm, said composite particles comprising:
   inorganic particles;
   a gluing agent coating layer formed on surface of said inorganic particle;
   an organic pigment coat formed onto said gluing agent coating layer in an amount of from 1 to 500 parts by weight based on 100 parts by weight of said inorganic particles; and
   a surface coating layer composed of at least one material selected from the group consisting of a fatty acid, a fatty acid metal salt and a coupling agent, which is formed on said organic pigment coat in an amount of 0.1 to 10.0% by weight based on the total weight of the composite particles including the surface coating layer, and a filler, said color agent being contained in an amount of 0.1 to 60% by weight based on the weight of the road marking material.

6. A road marking material according to claim 5, wherein said filler is at least one material selected from the group consisting of calcium carbonate, talc, silica powder and glass beads.

7. A road marking material according to claim 5, further comprising at least one material selected from the group consisting of a reflecting material, a plasticizer, a solvent, a defoamer, a surfactant and an assistant.

8. A road marking material according to claim 5, wherein said road marking material has an abrasion resistance of not more than 400 mg, a light resistance ($\Delta E^*$ value) of not more than 5.0 and an aging resistance ($\Delta E^*$ value) of not more than 2.5.

* * * * *